(12) United States Patent
Patel et al.

(10) Patent No.: US 7,807,593 B2
(45) Date of Patent: Oct. 5, 2010

(54) MULTI-LAYER, PRE-STRETCHED ELASTIC ARTICLES

(75) Inventors: Rajen M. Patel, Lake Jackson, TX (US); Andy Chang, Houston, TX (US)

(73) Assignee: Dow Global Technologies Inc., Midland, MI (US)

( * ) Notice: Subject to any disclaimer, the term of this patent is extended or adjusted under 35 U.S.C. 154(b) by 264 days.

(21) Appl. No.: 11/552,284

(22) Filed: Oct. 24, 2006

(65) Prior Publication Data

US 2007/0254176 A1 Nov. 1, 2007

Related U.S. Application Data

(60) Provisional application No. 60/730,338, filed on Oct. 26, 2005.

(51) Int. Cl.
B32B 27/12 (2006.01)
B32B 25/02 (2006.01)

(52) U.S. Cl. .................... 442/398; 442/360; 442/361; 442/362; 442/363; 442/364; 442/381; 442/328; 442/394; 428/296.7

(58) Field of Classification Search ......... 442/361–364, 442/328, 394, 398, 381
See application file for complete search history.

(56) References Cited

U.S. PATENT DOCUMENTS

| | | | |
|---|---|---|---|
| 4,476,180 A | 10/1984 | Wnuk | |
| 4,522,982 A | 6/1985 | Ewen | |
| 4,540,753 A | 9/1985 | Cozewith et al. | |
| 4,629,643 A | 12/1986 | Curro et al. | |
| 4,714,735 A | 12/1987 | Hodgson, Jr. et al. | |
| 4,820,590 A | 4/1989 | Hodgson, Jr. et al. | |
| 4,880,682 A | 11/1989 | Hazelton et al. | |
| 5,026,798 A | 6/1991 | Canich | |
| 5,336,545 A | 8/1994 | Morman | |
| 5,344,691 A | 9/1994 | Hanschen et al. | |
| 5,354,597 A | 10/1994 | Capik et al. | |
| 5,376,430 A | 12/1994 | Swenson et al. | |
| 5,405,565 A * | 4/1995 | Sumida et al. | 264/173.14 |
| 5,422,178 A | 6/1995 | Swenson et al. | |
| 5,424,025 A | 6/1995 | Hanschen et al. | |
| 5,429,856 A | 7/1995 | Krueger et al. | |
| 5,462,708 A | 10/1995 | Swenson et al. | |
| 5,468,428 A | 11/1995 | Hanschen et al. | |
| 5,501,679 A | 3/1996 | Krueger et al. | |
| 5,504,172 A | 4/1996 | Imuta et al. | |
| 5,514,470 A | 5/1996 | Haffner et al. | |
| 5,614,141 A * | 3/1997 | Sumida et al. | 264/173.14 |
| 5,620,780 A | 4/1997 | Krueger et al. | |
| 5,691,034 A | 11/1997 | Krueger et al. | |
| 5,747,621 A | 5/1998 | Resconi et al. | |
| 5,800,903 A | 9/1998 | Wood et al. | |
| 5,814,413 A | 9/1998 | Beerwart | |
| 5,969,070 A | 10/1999 | Waymouth et al. | |
| 5,977,251 A | 11/1999 | Kao et al. | |
| 6,010,588 A | 1/2000 | Stahl et al. | |
| 6,048,950 A | 4/2000 | Dolle et al. | |
| 6,225,243 B1 | 5/2001 | Austin | |
| 6,265,212 B1 | 7/2001 | Fallaux et al. | |
| 6,448,358 B2 | 9/2002 | Siedle et al. | |
| 6,649,548 B1 | 11/2003 | Shawver et al. | |
| 6,906,160 B2 | 6/2005 | Stevens et al. | |
| 6,919,407 B2 | 7/2005 | Tau et al. | |
| 6,927,256 B2 | 8/2005 | Stevens et al. | |
| 6,943,215 B2 | 9/2005 | Stevens et al. | |
| 6,960,635 B2 | 11/2005 | Stevens et al. | |
| 2007/0254176 A1 | 11/2007 | Patel et al. | |

FOREIGN PATENT DOCUMENTS

| | | |
|---|---|---|
| EP | 0277004 | 8/1988 |
| EP | 0426637 A2 | 5/1991 |
| EP | 0426638 A2 | 5/1991 |
| EP | 0 500 590 B1 | 9/1992 |
| EP | 1070087 | 1/2001 |
| JP | 402092977 A * | 4/1990 |
| JP | 9085911 | 3/1997 |
| JP | 2003082137 | 3/2003 |
| JP | 2005194514 | 7/2005 |

(Continued)

OTHER PUBLICATIONS

Otocka, et al., Macromolecules, vol. 4, No. 4, pp. 507-514 (1971).
Randall, Journal of Macromol. Chem. Phys., C29 (2&3), pp. 201-317 (1989).
Scholte, et al., Journal of Applied Polymer Science, vol. 29, pp. 3763-3782 (1984).
Sassmannshausen, et al., Journal of Organometallic Chemistry, vol. 548, pp. 23-28 (1997).
Ver Strate, et al., Macromolecules, vol. 21, No. 12, pp. 3360-3371 (1988).

(Continued)

Primary Examiner—Lynda Salvatore
(74) Attorney, Agent, or Firm—Whyte Hirschboeck Dudek SC

(57) ABSTRACT

In one embodiment the invention is an article comprising at least two layers, a first or low crystallinity layer comprising a low crystallinity polymer and a second or high crystallinity layer comprising a high crystallinity polymer. The high crystallinity polymer has a melting point as determined by differential scanning calorimetry (DSC) that is about the same or within less than 25 C of the melting point of the low crystallinity polymer. The article is elongated at a temperature below the melting point of the low crystallinity polymer in at least one direction to an elongation of at least about 50% of its original length or width, to form a pre-stretched article. Preferably, the high crystallinity layer is capable of undergoing plastic deformation upon the elongation.

56 Claims, 4 Drawing Sheets

FOREIGN PATENT DOCUMENTS

| | | |
|---|---|---|
| WO | 9827154 | 6/1998 |
| WO | 9907788 | 2/1999 |
| WO | 9947339 | 9/1999 |
| WO | 0001745 | 1/2000 |
| WO | 0001766 | 1/2000 |
| WO | 0069963 | 11/2000 |
| WO | 0105574 | 1/2001 |
| WO | 0234795 | 5/2002 |
| WO | 02083753 | 10/2002 |
| WO | 03040442 | 5/2003 |
| WO | 2004063270 A2 | 7/2004 |

OTHER PUBLICATIONS

Wheeler, et al., Applied Spectroscopy, vol. 47, No. 8, pp. 1128-1130 (1993).

Wu, Polymer Engineering and Science, vol. 27, No. 5, pp. 335-343 (1987).

* cited by examiner

MULTI-LAYER, PRE-STRETCHED ELASTIC ARTICLES

CROSS REFERENCE TO RELATED APPLICATION

This application claims the benefit under 35 USC §119(e) of U.S. Provisional Application No. 60/730,338 filed Oct. 26, 2005.

FIELD OF THE INVENTION

This invention relates to articles such as films, fabrics and fibers. In one aspect, the invention relates to elastic articles while in another aspect, the invention relates to multi-layer, pre-stretched, elastic articles. In still another aspect, the invention relates to multi-layer, pre-stretched elastic articles comprising a low crystallinity layer comprising a low crystallinity polymer and a high crystallinity layer comprising a high crystallinity polymer. In yet another aspect, the invention relates to such articles in which the melting point of the low crystallinity polymer is within about less than 25 C of the melting point of the high crystallinity polymer.

BACKGROUND OF THE INVENTION

Known co-extrusion processes involve melting of at least two separate polymer compositions and their simultaneous extrusion and immediate combination. The extrudate can be cooled until the polymers have solidified and can be mechanically wound onto a roll. Winding the extrudate around a chilled roll may accelerate the cooling. The extrudate may be oriented to a controlled degree in the machine and/or transverse direction. This drawing may be performed at temperatures below the melting point of the co-extrudate. In this way, articles can be made combining the desired properties of different polymer compositions.

Co-extruded films are generally made from polymer compositions, which develop considerable mechanical strength upon cooling by the forming of crystalline phases. Such polymer compositions are also capable of developing increased strength upon orientation of the compositions and better alignment of the crystalline regions.

Elasticity in films is desired for a number of applications. Examples of such applications are in personal care products, such as diaper back sheets, diaper waistbands, and diaper ears; medical applications, such as gowns and bags; and garment applications, such as disposable wear. In use in the final structure, elastic articles can provide desirable characteristics, such as helping to achieve compliance of garments to an underlying shape. In diaper waistbands, for example, a high elastic recovery ensures the return of the waistband to its original shape throughout the use of the diaper.

Elasticity is generally obtained from the use of amorphous elastomeric polymer compositions. There are, however, many difficulties and problems associated with the processing of such polymer compositions into articles such as films and fibers. For example, elasticity limits the line speed, particularly during processing at high line speeds, because the tension applied to the film causes the film to extend, sometimes in an unstable manner.

Furthermore, elastic polymers are generally high molecular weight amorphous polymers that can be difficult to process into articles such as films, fabrics and fibers. Another difficulty in processing elastic films arises from the tackiness of the films on the roll, which causes "blocking", i.e., sticking of the film to itself. This limits the storage of the article after it has been produced. Elastic polymers can also have poor aesthetics, including, for example, poor surface appearance and a rubbery or tacky feel or touch.

Several approaches have been taken to alleviate these problems. U.S. Pat. No. 6,649,548 discloses laminates of nonwoven fabrics with films to impart a better feel. U.S. Pat. Nos. 4,629,643 and 5,814,413 and PCT Publications WO 99/47339 and WO 01/05574 disclose various mechanical and processing techniques used to emboss or texture the film surface in order to increase the surface area and improve the feel. U.S. Pat. Nos. 4,714,735 and 4,820,590 disclose films comprising an elastomer, ethylene vinyl acetate (EVA), and process oil that are prepared by orienting the film at elevated temperature and annealing the film to freeze in the stresses. The film is subsequently heated, which shrinks and forms an elastic film.

In one embodiment, these references also disclose films having layers of ethylene polymers or copolymers on either side of the elastic film to reduce tackiness. By heat-setting the film, it can be stabilized in its extended condition. Upon application of heat higher than the heat setting temperature, the heat set is removed and the film returns to its original length and remains elastic. Two heating steps are involved, adding cost and complexity. U.S. Pat. No. 4,880,682 discloses a multilayer film comprising an elastomer core layer and thermoplastic skin layer(s). The elastomers are ethylene/propylene (EP) rubbers, ethylene/propylene/diene monomer rubbers (EPDM), and butyl rubber, in a laminated structure with EVA as the skin layers. After casting, these films are oriented to yield films having a micro-undulated surface providing a low gloss film.

Micro-textured elastomeric laminated films having at least one adhesive layer are disclosed in U.S. Pat. Nos. 5,354,597 and 5,376,430. U.S. Pat. No. 4,476,180 describes blends of styrenic block copolymer based elastomers with ethylene-vinyl acetate copolymers to reduce the tackiness without excessively degrading the mechanical properties.

WO 2004/063270 describes an article that includes a low crystallinity layer and high crystallinity layer capable of undergoing plastic deformation upon elongation. The crystallinity layer includes a low crystallinity polymer and, optionally, an additional polymer. The high crystallinity layer includes a high crystallinity polymer having a melting point at least 25 C higher than that of the low crystallinity polymer. The low crystallinity polymer and the high crystallinity polymer can have compatible crystallinity.

SUMMARY OF THE INVENTION

In one embodiment the invention is an article comprising at least two layers, a first or low crystallinity layer comprising a low crystallinity polymer and a second or high crystallinity layer comprising a high crystallinity polymer. The high crystallinity polymer has a melting point as determined by differential scanning calorimetry (DSC) that is about the same or within less than 25 C, preferably about the same or within less than 20 C, of the melting point of the low crystallinity polymer. The article is elongated at a temperature below the melting point of the low crystallinity polymer in at least one direction to an elongation of at least about 50%, preferably at least about 100%, more preferably at least about 150% and as much as 300% or more, of its original length or width, to form a pre-stretched article. Preferably, the high crystallinity layer is capable of undergoing plastic deformation upon the elongation. Each layer can be a film or nonwoven.

In a second embodiment the invention is also an article comprising at least two layers, a first or low crystallinity layer comprising a low crystallinity polymer and a second or high crystallinity layer comprising a high crystallinity polymer. In this embodiment, however, the high crystallinity polymer has a melting point as determined by DSC that is lower than the melting point of the low crystallinity polymer, preferably lower than the melting point of the low crystallinity polymer by not more than about 50 C. The article is elongated at a temperature below the melting point of the low crystallinity polymer in at least one direction to an elongation of at least about 50%, preferably at least about 100% and more preferably at least about 150%, of its original length or width, to form a pre-stretched article.

In a third embodiment, the invention is a pre-stretched, multi-layer film comprising:

A. A core layer comprising (i) opposing first and second planar surfaces, and (ii) a low crystalline, elastic polymer, and B. First and second outer layers each comprising (i) opposing first and second planar surfaces, and (ii) a high crystalline polymer, the second or bottom planar surface of the first outer layer in intimate contact with the first or top planar surface of the core layer and the first or top planar surface of the second outer layer in intimate contact with the bottom or second planar surface of the core layer, with the provisos that (i) the melting point of the high crystalline polymer is less than the melting point of the low crystalline polymer, or (ii) the melting point of the high crystalline polymer is no more than 25 C above the melting point of the low crystalline polymer. The high crystalline polymer of one skin layer can be the same or different than the high crystalline polymer of the other skin layer. Preferably the core layer polymer is a propylene copolymer, and the skin layer polymer is typically a polyolefin. Typically, the skin layer polymer of the first and second outer layers is the same. Upon preparation, the film is stretched or activated, typically at an elongation of at least about 50%, preferably at least about 100% and more preferably at least about 150% and up to 300% or more, of its original length or width.

In a fourth embodiment, the invention is a process for making a pre-stretched, multi-layer film comprising at least two layers, a first or low crystallinity layer comprising a low crystallinity polymer and a second or high crystallinity layer comprising a high crystallinity polymer. The high crystallinity polymer has a melting point as determined by DSC that is about the same or within less than 25 C of the melting point of the low crystallinity polymer. The process comprises the steps of: (1) forming the film, and (2) elongating the film in at least one direction to at least about 50%, preferably at least about 100%, more preferably at least about 150% and up to 300% or more, of its original length or width. Preferably, the film is elongated at a temperature below the melting point of the high crystallinity polymer, more preferably at a temperature below the melting point of the low crystallinity polymer. The elongation step produces a film with a haze value of greater than 0%, typically of at least 10%, more typically of at least 25%, and even more typically of at least 50%.

In a fifth embodiment, the invention is the article described in the first and second embodiments in the form of a fiber, preferably a bicomponent fiber. Preferably, the low crystallinity polymer comprises at least a portion of the surface of the fiber, especially in fibers with a configuration of sheath/core, side-by-side, crescent moon, tri-lobal, islands-in-the-sea, or flat. Fibers in which the high crystallinity polymer has been plastically deformed are particularly preferred.

Other embodiments of the invention include the article in the form of a woven, nonwoven or woven/nonwoven blended fabric, films comprising four or more layers, garments and other structures made from the articles, e.g., diaper backsheets and elastic tabs, hospital wear, etc., cross-linked articles, articles containing fillers and the like. Methods for making a laminate nonwoven structure are known in the art, e.g., U.S. Pat. Nos. 5,336,545 and 5,514,470.

In all embodiments of this invention, preferably the weight percent crystallinity difference between the high and low crystallinity polymers is at least about 1%, preferably at least about 3% and more preferably at least about 5%. Preferably the weight percent crystallinity difference between the high and low crystalline polymers is not in excess of about 90%, preferably not in excess of about 80% and more preferably not in excess of about 70%.

DETAILED DESCRIPTION OF THE INVENTION

Figure 1:
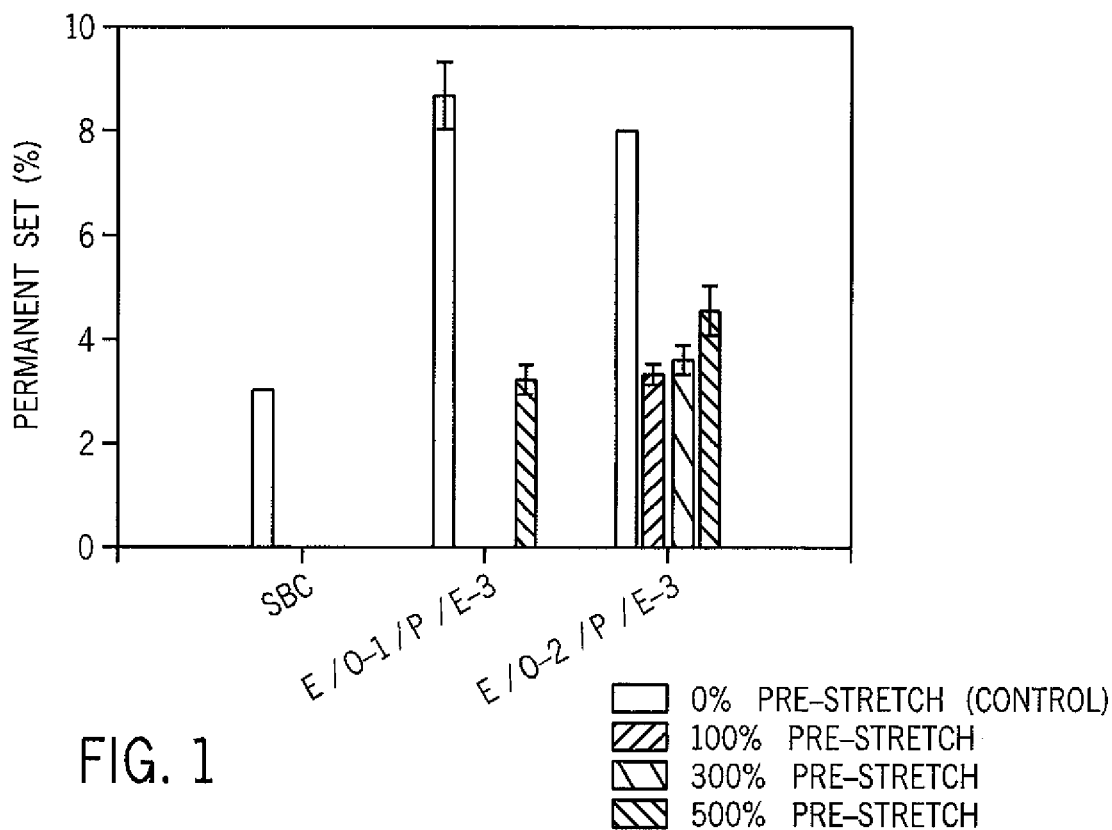
FIG. 1 is a plot of the effect of pre-stretch level on permanent set after a 50% hysteresis test.

"Low crystallinity", "high crystallinity" and like terms are not used in an absolute sense, rather they are used in a sense relative to one another. Typical high crystalline polymers include linear low density polyethylene (LLDPE), low density polyethylene (LDPE), high density polyethylene (HDPE), homopolypropylene (hPP), random copolymer of propylene (RCP), and the like. Low crystalline propylene copolymers of particular interest include propylene/ethylene, propylene/1-butene, propylene/1-hexene, propylene/4-methyl-1-pentene, propylene/1-octene propylene/ethylene/1-butene, propylene/ethylene/ENB, propylene/ethylene/1-hexene, propylene/ethylene/1-octene, propylene/styrene, and propylene/ethylene/styrene. Representative of these copolymers are the VERSIFY™ elastic propylene copolymers manufactured and marketed by The Dow Chemical Company. These copolymers are made using a metal-centered, heteroaryl ligand catalyst in combination with one or more activators, e.g., an alumoxane. In certain embodiments, the metal is one or more of hafnium and zirconium. The VERSIFY™ elastic propylene copolymers and similarly made copolymers are more fully described in U.S. Pat. Nos. 6,906,160, 6,919,407 and 6,927,256. With that noted, in an article comprising two layers of which one layer comprises an hPP polymer with a crystallinity of 50% and another layer comprises an hPP polymer with a crystallinity of 65%, the layer and polymer with a crystallinity of 50% is the low crystalline layer and polymer relative to the layer and polymer with a crystallinity of 65% which is the high crystalline layer and polymer.

The term "polymer" generally includes, but is not limited to, homopolymers, copolymers, such as, for example, block, graft, random and alternating copolymers, terpolymers, etc., and blends and modifications of the same. Furthermore, unless otherwise specifically limited, the term "polymer" shall include all possible geometrical configurations of the material. These configurations include, but are not limited to, isotactic, syndiotactic and random symmetries.

The terms "polypropylene-based plastomers" (PBP) or "propylene-based elastomers" (PBE) include reactor grade copolymers of propylene having heat of fusion less than about 100 J/g and MWD<3.5. The PBPs generally have a heat of fusion less than about 100 J/g while the PBEs generally have a heat of fusion less than about 40 J/g. The PBPs typically have a weight percent ethylene in the range of about 3 to about 15 wt %, with the elastomeric PBEs being of about 10 to 15 wt % ethylene.

All percentages specified herein are weight percentages unless otherwise specified.

The copolymer is a PBP or PBE having MWD less than (<) about 3.5, and having heat of fusion less than about 90 J/g, preferably less than about 70 J/g, more preferably less than about 50 J/g. When ethylene is used as a comonomer, the reactor grade propylene-based elastomer or plastomer has from about 3 to about 15 percent of ethylene, preferably from about 5 to about 14 percent of ethylene, more preferably about 9 to about 14 percent ethylene, by weight of the propylene-based elastomer or plastomer. Suitable propylene-based elastomers and/or plastomers are taught in WO 03/040442.

Of particular interest for use in the present invention are reactor grade PBEs having MWD less than about 3.5. The term "reactor grade" is defined in U.S. Pat. No. 6,010,588 and in general refers to a polyolefin resin whose molecular weight distribution or polydispersity has not been substantially altered after polymerization.

Although the remaining units of the propylene copolymer are derived from at least one comonomer such as ethylene, a $C_{4-20}$ α-olefin, a $C_{4-20}$ diene, a styrenic compound and the like, preferably the comonomer is at least one of ethylene and a $C_{4-12}$ α-olefin such as 1-hexene or 1-octene. Preferably, the remaining units of the copolymer are derived only from ethylene.

The amount of comonomer other than ethylene in the propylene-based elastomer or plastomer is a function of, at least in part, the comonomer and the desired heat of fusion of the copolymer. If the comonomer is ethylene, then typically the comonomer-derived units comprise not in excess of about 15 wt % of the copolymer. The minimum amount of ethylene-derived units is typically at least about 3, preferable at least about 5 and more preferably at least about 9, wt % based upon the weight of the copolymer. If the polymer comprises at least one other comonomer other than ethylene, then the preferred composition would have a heat of fusion approximately in the range of a propylene-ethylene copolymer with about 3 to 20 wt. % ethylene. Polymers of approximately similar crystallinity and crystal morphology are preferred for use in a nonwoven.

The propylene-based elastomers or plastomers of this invention can be made by any process, and include copolymers made by Zeigler-Natta, CGC (Constrained Geometry Catalyst), metallocene, and nonmetallocene, metal-centered, heteroaryl ligand catalysis. Exemplary propylene copolymers include propylene/ethylene copolymers available from The Dow Chemical Company.

The density of the propylene-based elastomers or plastomers used in the practice of this invention is typically at least about 0.850, or at least about 0.860, or at least about 0.865 grams per cubic centimeter (g/cm$^3$) as measured by ASTM D-792.

The weight average molecular weight (Mw) of the propylene-based elastomers or plastomers of this invention can vary widely, but typically it is between about 10,000 and 1,000,000 (with the understanding that the only limit on the minimum or the maximum $M_w$ is that set by practical considerations). For homopolymers and copolymers used in the manufacture of films, the melt flow rate (MFR, as measured by ASTM D-1238, Condition L (2.16 kg, 230 C)) typically spans about 0.10 to 10 for blown film and about 0.50 to 50 for cast film processes.

The polydispersity of the propylene based elastomers or plastomers of this invention is typically between about 2 and about 3.5. "Narrow polydisperity", "narrow molecular weight distribution", "narrow MWD" and similar terms mean a ratio ($M_w/M_n$) of weight average molecular weight ($M_w$) to number average molecular weight ($M_n$) of less than about 3.5, or less than about 3.0, or less than about 2.8, or less than about 2.5, or less than about 2.3. In multilayer aspects of this invention, it is generally desirable that the viscosity of the various layers be approximately the same for given shear rates and temperatures.

Gel Permeation Chromatography

Molecular weight and molecular weight distribution of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160 C with the autosampler hot zone at 160 C and the warm zone at 145 C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160 C with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent polypropylene molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N. Y. Hellman, P. M. Muglia, Macromolecules, 4, 507 (1971)) in the Mark-Houwink equation:

$$\{N\}=KM^a$$

where $K_{pp}$=1.90E-04, $a_{pp}$=0.725 and $K_{ps}$=1.26E-04, $a_{ps}$=0.702.

The PBE for use in the present invention ideally have an MFR of from 0.1 to 600 g/10 min. MFR for copolymers of propylene and ethylene and/or one or more $C_4$-$C_{20}$ α-olefins is measured according to ASTM D-1238, Condition L (2.16 kg, 230 C).

For cast film, preferably the melt flow rate of at least one of the layers is at least about 2 g/10 min and more preferably from about 5 to 50 g/10 min. For blown film, preferably at least one of the layers have a melt flow rate of less than about 9 g/10 min and more preferably less than about 6 g/10 in.

The Article

One embodiment of the invention includes an article comprising a low crystallinity layer and a high crystallinity layer, the high crystallinity layer capable of undergoing plastic deformation upon elongation. "Elongation" is a uni-axial or biaxial stretching of the article to a degree sufficient to cause plastic deformation of the high crystallinity layer. The extent of plastic deformation and the amount of elongation require to plastically deform an article are readily determined by determining the amount of surface roughness and/or increase in Haze value.

The total amount of low and high crystalline polymer in the article can vary to convenience, but typically the article is comprised mostly (more than 50 weight percent) of the two polymers. In one embodiment, the article comprises at least about 75 weight percent, while in another embodiment it comprises at least about 90 weight percent. In certain embodiments of this invention, the article comprises, save for various low levels of additives, of essentially 100 weight percent of the two polymers. The high crystalline polymer is typically present in the article, relative to the combined weight of the high and low crystalline polymers, at less than about 20, preferably less than about 10, more preferably less than about 6 and as low as about 2, weight percent. The high crystalline polymer is typically present in the article, relative to the combined weight of the high and low crystalline polymers, in an amount of at least about 45, preferably at least about 60, more preferably at least about 80 and as high as about 98, weight percent.

The article prior to pre-stretching has poor elastic and hysteresis characteristics due to the influence of the high crystallinity layer(s). However, upon elongating the article beyond the plastic deformation point of the high crystallinity layer(s), the elastic and hysteresis properties are improved, e.g., the effect of pre-stretching films above 50% strain results in subsequent lower permanent set (see FIGS. 1-3).

Dimensional profile (surface roughness) and increase in Haze value can be used by one of ordinary skill in the art to determine whether an article is plastically deformed. Haze is measured according to ASTM D1003 using a HazeGard PLUS Hazemeter available from BYK Gardner of Melville, N.Y., with a light source CIE Illuminant C. Plastically deformed articles according to the invention can have a Haze value of greater than about 70%, or greater than about 80%, or greater than about 90%. The plastically deformed articles have an increased haze value compared to the article prior to elongation. Though not limited by theory, the change (increase) in haze is thought to originate from an increase in surface roughness. Surface roughness is thought to originate from differential recovery behavior after deformation. Upon deformation, the high and low crystallinity layers are thought to extend similarly but upon release, there is differential recovery behavior between the higher lower crystallinity layers. Lower recovery (higher set) of the higher crystallinity layer and the retractive force of the lower crystallinity layer is thought to produce a mechanical instability and result in a structure that can be described as corrugated, micro-undulated, micro-textured, or crenulated.

The surface roughness of the article can be measured by a number of instruments capable of precise surface roughness measurements. One such instrument is Surfcom 110B manufactured by Tokyo Seimitsu Company. The Surfcom instrument contains a diamond stylus which moves across the surface of the sample. The sample can range in hardness from metal to plastic to rubber. The instrument records the surface irregularities over the length traveled by the stylus. The surface roughness is quantified using a combination of three factors Ra (pm)—the arithmetic mean representing the departure of the extrudate surface profile from a mean line; Ry (m)—the sum of the height of the highest peak from a mean line and the depth of the deepest valley from a mean line; and Rz (um)—the sum of two means which are the average height of the five highest peaks from a mean line and the average depth of the five deepest valleys from a mean line. The combination of the Ra, Ry and Rz values characterize the surface profile of the film. By comparing the values of the non-elongated film against the values of the plastically deformed film, the increase in the roughness of the film surface, and thus the effectiveness of the orientation process, can be determined.

In some embodiments, the article is elongated in at least one direction to at least about 100%, or at least about 150%, of its original length or width. Generally, the article is elongated at a temperature below the melting temperature of either of the low crystallinity polymer or high crystallinity polymer. This "pre-stretching" step is accomplished by any means known to those skilled in the art, especially however, they are particularly suited for MD (machine direction) and/or CD (cross direction) orientation activation methods including ring-rolling, MD orientation (MDO), and a stretch-bonded lamination process. This stretching is a "pre-stretch" in the context that the film will again be likely stretched in its ultimate use, e.g., packaging or shipping or hygiene applications. This step can be performed on the articles of invention alone or the articles of invention in laminate form. This process can also be used on elastic nonwovens.

Typically the article is formed using any fabrication process, such as an extrusion coated or cast film process, separated or recovered from that process, and then pre-stretched. Preferably the article is pre-stretched after the article has solidified (more preferably, but not necessarily, crystallized). Operating at or above the melting point of the lower crystallinity layer is not favored for this invention as is typical, for example, in the double bubble orientation (Pahlke) process, and because generally it will not produce the desired structures. Preferably, the lower crystallinity layer has achieved its maximum crystallinity before the pre-stretch procedure.

This invention is especially useful for film converters who must store the elastic film on rolls prior to assembly into laminate structures. A particular challenge for conventional elastic film is blocking. This invention serves to remedy this problem. This invention is also useful during conversion to reduce the coefficient of friction and to increase the stiffness of the film during conveyance, cutting, assembly, and other steps. Other applications include elastic diaper back-sheets, feminine hygiene films, elastic strips, elastic laminates in gowns, sheets and the like.

In one particular embodiment, the article is formed by co-extruding the low crystallinity layer and high crystallinity layer prior to elongation. The article can optionally be oriented in the machine direction (MD) or the transverse direction (TD) or both directions (biaxially) using conventional equipment and processes. Orientation can be carried in a separate step prior to the elongation step described below. Thus, an oriented article can be prepared as an intermediate product, which is then later elongated in a separate step. In this embodiment, the orientation is preferably carried out such that minimal plastic deformation of the high crystallinity layer occurs. Alternatively, orientation and elongation to plastic deformation can be carried out in a single step.

In some embodiments the low crystallinity layer is in contact or intimate contact with the high crystallinity layer. The term "in contact" means that there is sufficient interfacial adhesion provided by, for example, compatible crystallinity, such that adjacent polymeric layers do not delaminate, even after orientation and/or elongation. The term "in intimate contact" means that essentially one full planar surface of one layer is in an adhering relationship with a planar surface of another layer. Typically the two planar surfaces are co-terminus with one another. In certain embodiments the low crystallinity layer adheres to the high crystallinity layer trough the use of conventional materials, such as adhesives.

Figure 4:
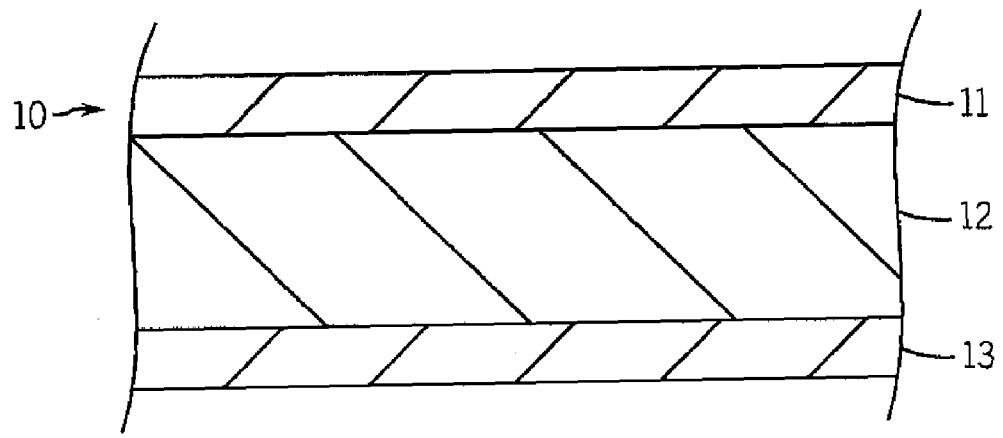
FIG. 4 is a schematic of a three-layer film of this invention.
Figure 5:
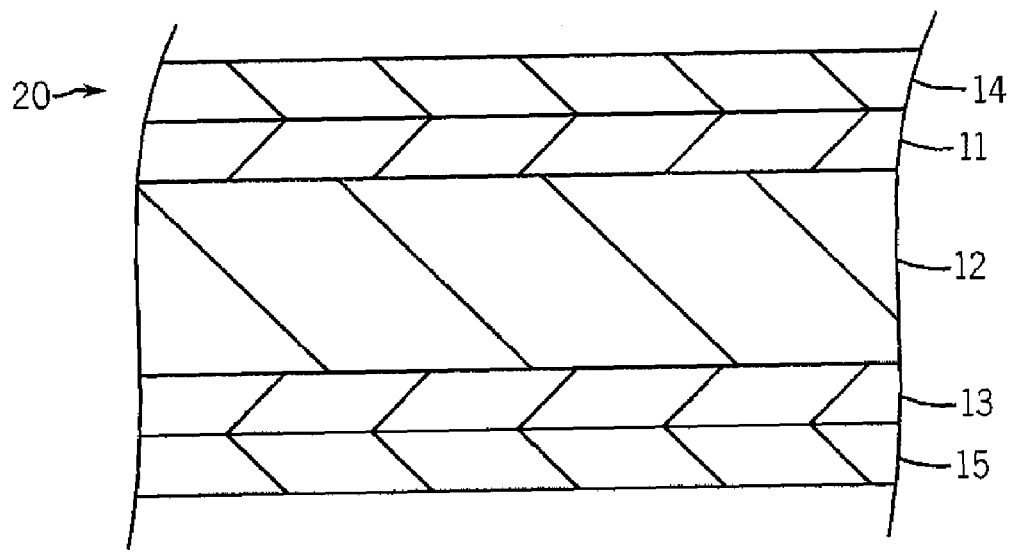
FIG. 5 is a schematic of one embodiment a five-layer film of this invention comprising one core layer, two internal skin layers and two external skin layers.
Figure 6:
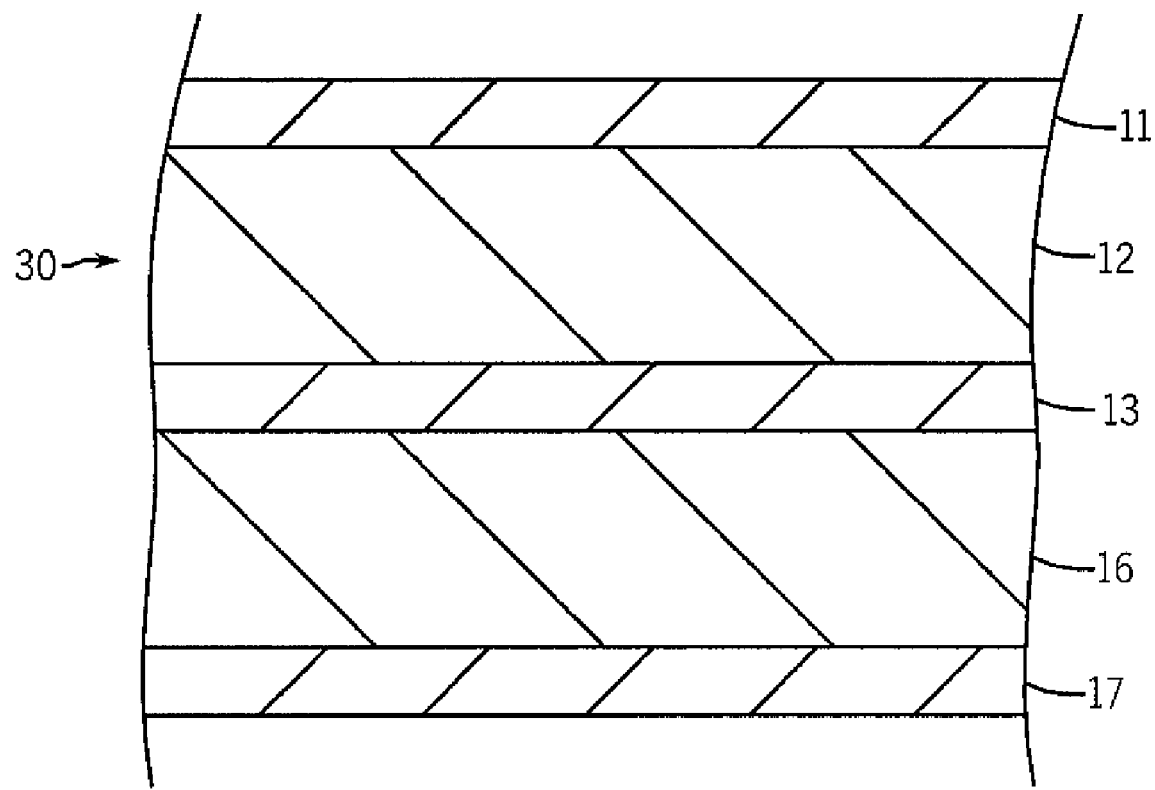
FIG. 6 is a schematic of an alternative embodiment of a five-layer film of this invention comprising two external skin layers and two core layers separated by an internal skin layer.

Certain embodiments of the invention are described generally with reference to FIGS. 4-6. The purpose of these Figures is to illustrate certain embodiments only, and not for the purpose of limiting the scope of the invention. In the drawings like numerals are used to designate like parts throughout the same.

FIG. 4 is a schematic drawing of three-layer film 10 comprising first skin or outer layer 11 the bottom or second surface of which is in intimate contact with a top or first planar surface of core or inner layer 12. The bottom or second planar surface of core layer 12, which is opposite the top planar surface of core layer 12, is in intimate contact with a top or first planar surface of second skin or outer layer 13.

"Planar surface" is used in distinction to "edge surface". If rectangular in shape or configuration, a film will comprise two opposing planar surfaces joined by four edge surfaces (two opposing pairs of edge surfaces, each pair intersecting the other pair at right angles). The bottom planar surface of the first skin layer is adapted to join or adhere to the top planar surface of the core layer, and the top planar surface of the second skin layer is adapted to join or adhere to the bottom planar surface of the core layer. In practice, the first and second skin layers are typically of the same composition and as such, are interchangeable. Likewise, the top and bottom planar surfaces of both the skin and core layers are functionally essentially the same and as such, each layer can be "flipped", i.e., the top planar surface can serve as the bottom planar surface, and vice versa. The films can be of any size and shape and as such, so can the planar and edge surfaces, e.g., thin or thick, polygonal or circular, etc. Typically, the film is in an extended ribbon form.

FIG. 5 illustrates a film of this invention if a five-layer format. In this embodiment, core layer 12 and skin layers 11 and 13 remain in the same relationship as illustrated in FIG. 4 except that the top planar surface of skin layer 11 is in intimate contact with the bottom planar surface of first exterior skin layer 14, and the bottom planar surface of skin layer 13 is in intimate contact with the top planar surface of second exterior skin layer 15.

FIG. 6 illustrates an alternative five-layer film of this invention. In this embodiment, core layers 12 and 13 are separated by interior skin layer 13, while the top planar surface of core layer 12 is in intimate contact with the bottom planar surface of exterior skin layer 11 and the bottom planar surface of core layer 16 is in intimate contact with the top planar surface of exterior skin layer 17.

Other film constructions, e.g., 4-, 6-, 7-layer and greater (none of which are shown), are possible and included within the scope of this invention. In each film construction of this invention, each core layer is bounded on its planar surfaces by a skin layer.

The films of this invention can be prepared by any conventional process, and typically are formed by separately extruding the individual layers using conventional extrusion equipment, and then joining or laminating the respective planar surfaces of the individual layers to one another using conventional techniques and equipment, e.g., feeding the individual layers together in an aligned fashion through a set of pinch rollers.

The skin layers typically comprise less than 30 weight percent (wt %), preferably less than 20 wt % and more preferably less than 10 wt %, of a three-layer film consisting of one core layer and two skin layers. Each skin layer is typically the same as the other skin layer in thickness and weight although one skin layer can vary from the other in either or both measurements.

In another embodiment the article is a film wherein the high crystallinity layer forms a skin layer. In a different embodiment, the high crystallinity layer is intermediate to the low crystallinity layer and another type of skin layer, such as any conventional polymer layer. In yet another embodiment, high crystallinity layers are present on both sides of the low crystallinity layer. In this embodiment, the two high crystallinity layers can be the same or different in composition and the same or different in thickness. In yet another embodiment, the article includes, in sequence, a high crystallinity layer, a low crystallinity layer, and an additional low crystallinity layer. In this embodiment, the two low crystallinity layers can be the same or different in composition and the same or different in thickness. The article can comprise as many layers as desired.

The high crystallinity layer or one or more low crystallinity layers may also form a skin layer and be adapted to adhere by melting onto a substrate. Skin layers other than the high crystallinity and low crystallinity layer can also be adapted for melt adhesion onto a substrate.

Non-polymeric additives that can be added to one or more layers include, process oil, flow improvers, fire retardants, antioxidants, plasticizers, pigments, vulcanizing or curative agents, vulcanizing or curative accelerators, cure retarders, processing aids, flame retardants, tackifying resins, and the like. These compounds may include fillers and/or reinforcing materials. These include carbon black, clay, talc, calcium carbonate, mica, silica, silicate, and combinations of two or more of these materials. Other additives, which may be employed to enhance properties, include anti-blocking and coloring agents. Lubricants, mold release agents, nucleating agents, reinforcements, and fillers (including granular, fibrous, or powder-like) may also be employed. Nucleating agents and fillers tend to improve rigidity of the article. The exemplary lists provided above are not exhaustive of the various kinds and types of additives that can be employed with the present invention.

The overall thickness of the article is not particularly limited, but is typically less than 20 mil, often less than 10 mil. The thickness of any of the individual layers can vary widely, and are typically determined by process, use and economic considerations.

In a particular embodiment, the high crystallinity layer comprises medium or high density polyethylene and the low crystallinity layer comprises a plastomer. In another particular embodiment, the high crystallinity layer and low crystallinity layer comprise syndiotactic copolymers having relatively high and low crystallinity. In yet another particular embodiment, the high crystallinity layer comprises isotactic polypropylene and the low crystallinity layer comprises a polypropylene elastomer having relatively low levels of isotactic crystallinity.

Low Crystallinity Layer

The low crystallinity layer has a level of crystallinity that can be detected by Differential Scanning Calorimetry (DSC), but it has elastomeric properties. The low crystallinity layer is sufficiently elastic to permit extension of the high crystallinity layer to and beyond the point of plastic deformation without substantial loss of its elastic properties. The low crystallinity layer comprises a low crystallinity polymer and, optionally, at least one additional polymer. In certain embodiments, the low crystalline layer can be stretched to 50%, 100%, 150%, 300% and up to 500% or more of its pre-stretched length or width.

Low Crystallinity Polymer

The low crystallinity polymer of the present invention is a soft, elastic polymer with a moderate level of crystallinity due to stereo-regular propylene sequences. The low crystallinity polymer can be: (A) a propylene homopolymer in which the stereo-regularity is disrupted in some manner such as by regio-inversions, (B) a random propylene copolymer in which the propylene stereo-regularity is disrupted at least in part by comonomers; or (C) a combination of (A) and (B).

In a particular embodiment, the low crystallinity polymer is a copolymer of propylene and one or more comonomers selected from ethylene, $C_4$-$C_{12}$ α-olefins, and combinations of two or more such comonomers. In a particular aspect of this embodiment, the low crystallinity polymer includes units derived from the one or more comonomers in an amount ranging from a lower limit of about 2%, 5%, 6%, 8%, or 10% by weight to an upper limit of about 28%, 25%, or 20% by weight. This embodiment will also include propylene-derived units present in an amount ranging from a lower limit of about 72%, 75%, or 80% by weight to an upper limit of about 98%, 95%, 94%, 92%, or 90% by weight. These percentages by weight are based on the total weight of the propylene-derived and comonomer-derived units, i.e., based on the sum of weight percent propylene-derived units and weight percent comonomer-derived units equaling 100%.

Embodiments of the invention include low crystallinity polymers having a heat of fusion, as determined by DSC, ranging from a lower limit of about 1 Joules/gram (J/g), or 3 J/g, or 5 J/g, or 10 J/g, or 15 J/g, or 20 J/g, to an upper limit of about 125 J/g, or 100 J/g, or 75 J/g, or 57 J/g or 50 J/g, or 47 J/g, or 37 J/g, or 30 J/g. "Heat of fusion" is measured using DSC that can be measured using the following method.

Without being bound by theory, the low crystalline polymeric embodiments of the invention are believed to have generally isotactic crystallizable propylene sequences, and the above heats of fusion are believed to be due to the melting of these crystalline segments.

The crystallinity of the low crystallinity polymer may also be expressed in terms of crystallinity percent. The thermal energy for the highest order of polypropylene is taken to be 165 J/g. That is, 100% crystallinity is taken as being equal to 165 J/g. As such, the previously discussed heats of fusion suggest that the low crystallinity polymer has a polypropylene crystallinity within the range having an upper limit of about 35%, or 26%, or 22%, or 17.5% and a lower limit of about 2.6%, or 4.4%, or 6.1%, or 7%.

The level of crystallinity may be reflected in the melting point. "Melting point" is determined by DSC as previously discussed. The low crystallinity polymer, according to an embodiment of the invention has one or more melting points. Typically a sample of the polypropylene copolymer will show multiple melting peaks adjacent to the principal peak, which are considered together as a single melting point. The highest heat flow rate of these peaks is considered the melting point. The low crystallinity polymer can have a melting point determined by DSC ranging from an upper limit of about 130 C, or 105 C, or 90 C, or 80 C, or 70 C; to a lower limit of about 20 C, or 25 C, or 30 C, or 35 C, or 40 C or 45 C.

The low crystallinity polymer can have a weight average molecular weight (Mw) of from about 10,000 to about 5,000,000 g/mol, or from about 20,000 to about 1,000,000 g/mol, or from about 80,000 to about 500,000 g/mol and a molecular weight distribution Mw/Mn (MWD), sometimes referred to as a "polydispersity index" (PDI), ranging from a lower limit of about 1.5 or 1.8 to an upper limit of about 40 or 20 or 10 or 5 or 3. The Mw and MWD can be determined by a variety of methods, including those in U.S. Pat. No. 4,540,753 to Cozewith, et al., and the references cited by Cozewith, et al., or those methods found in Verstrate et al., Macromolecules, vol. 21, p. 3360 (1988).

In some embodiments of the invention, the low crystallinity polymer has a Mooney viscosity ML(1+4)125 C of about 100 or less, or 75 or less, or less, or 30 or less. Mooney viscosity is measured as ML(1+4)125° C. according to ASTM D1646 unless otherwise specified.

In one preferred embodiment of this invention, the propylene based elastomers or plastomers are further characterized as having at least one of the following properties: (i) $^{13}C$ NMR peaks corresponding to a regio-error at about 14.6 and about 15.7 ppm, the peaks of about equal intensity, (ii) a DSC curve with a $T_{me}$ that remains essentially the same and a $T_{max}$ that decreases as the amount of comonomer, i.e., the units derived from ethylene and/or the unsaturated comonomer(s), in the copolymer is increased, (iii) a B-value when measured according to the method of Koenig (described below) greater than about 1.03 when the comonomer content, i.e., the units derived from the comonomer other than propylene, is at least about 3 wt %, and (iv) a skewness index, $S_{ix}$, greater than about −1.20. Typically the copolymers of this embodiment are characterized by at least two, preferably three, and more preferably all four of these properties. In another embodiment of this invention, these copolymers are characterized further as also having (v) an X-ray diffraction pattern when the sample is slow-cooled that reports more gamma-form crystals than a comparable copolymer prepared with a Ziegler-Natta (Z-N) catalyst. Each of these properties and their respective measurements are described in detail in U.S. Pat. No. 6,943,215 although for purposes of this invention B-value and $^{13}C$ NMR are described below.

B-Value

"High B-value" and similar terms mean the ethylene units of a copolymer of propylene and ethylene, or a copolymer of propylene, ethylene and at least one unsaturated comonomer, is distributed across the polymer chain in a nonrandom manner. B-values range from 0 to 2. The higher the B-value, the more alternating the comonomer distribution in the copolymer. The lower the B-value, the more blocky or clustered the comonomer distribution in the copolymer. The high B-values of the polymers made using a nonmetallocene, metal-centered, heteroaryl ligand catalyst, such as described in U.S. Pat. No. 6,960,635, are typically at least about 1.03 as determined according to the method of Koenig (Spectroscopy of Polymers American Chemical Society, Washington, D.C., 1992), preferably at least about 1.04, more preferably at least about 1.05 and in some instances at least about 1.06. This is very different from propylene-based copolymers typically made with metallocene catalysts, which generally exhibit B-values less than 1.00, typically less than 0.95. There are several ways to calculate B-value; the method described below utilizes the method of Koenig, J. L., where a B-value of 1 designates a perfectly random distribution of comonomer units. The B-value as described by Koenig is calculated as follows.

B is defined for a propylene/ethylene copolymer as:

$$B = \frac{f(EP+PE)}{2 \cdot F_E \cdot F_P}$$

where f(EP+PE)=the sum of the EP and PE diad fractions; and Fe and Fp=the mole fraction of ethylene and propylene in the copolymer, respectively. The diad fraction can be derived from triad data according to: f(EP+PE)=[EPE]+[EPP+PPE]/2+[PEP]+[EEP+PEE]/2. The B-values can be calculated for other copolymers in an analogous manner by assignment of the respective copolymer diads. For example, calculation of the B-value for a propylene/1-octene copolymer uses the following equation:

$$B = \frac{f(OP+PO)}{2 \cdot F_O \cdot F_P}$$

For propylene polymers made with a metallocene catalyst, the B-values are typically between 0.8 and 0.95. In contrast, the B-values of the propylene polymers made with an activated nonmetallocene, metal-centered, heteroaryl ligand catalyst (as described below), are above about 1.03, typically between about 1.04 and about 1.08. In turn, this means that for any propylene-ethylene copolymer made with such a nonmetallocene metal-centered, heteroaryl catalyst, not only is the propylene block length relatively short for a given percentage of ethylene but very little, if any, long sequences of 3 or more sequential ethylene insertions are present in the copolymer, unless the ethylene content of the polymer is very high. The data in the following table are illustrative. The data for Table A below were made in a solution loop polymerization process similar to that described in U.S. Pat. No. 5,977,251 to Kao et al., using an activated nonmetallocene, metal-centered, heteroaryl ligand catalysts as generally described in U.S. Pat. No. 6,960,635. Interestingly, the B-values of the propylene polymers made with the nonmetallocene, metal-centered, heteroaryl ligand catalysts remain high even for polymers with relatively large amounts, e.g., >30 mole % ethylene.

$^{13}$C NMR

The propylene ethylene copolymers suitable for use in this invention typically have substantially isotactic propylene sequences. "Substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well known in the art and are described in, for example, U.S. Pat. No. 5,504,172 and WO 00/01745 that refer to the isotactic sequence in terms of a triad unit in the copolymer molecular chain determined by $^{13}$C NMR spectra. $^{13}$C NMR spectra are determined as follows.

$^{13}$C NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance of sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of an isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data are collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^{1}$H decoupling, 4000 transients per data file, a 7 sec pulse repetition delay, spectral width of 24,200 Hz and a file size of 32K data points, with the probe head heated to 130 C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm. Isotacticity at the triad level (mm) is determined from the methyl integrals representing the mm triad (22.5 to 21.28 ppm), the mr triad (21.28-20.40 ppm), and the rr triad (20.67-19.4 ppm). The percentage of mm tacticity is determined by dividing the intensity of the mm triad by the sum of the mm, mr, and rr triads. For propylene-ethylene copolymers made with catalyst systems, such as the nonmetallocene, metal-centered, heteroaryl ligand catalyst (described above), the mr region is corrected for ethylene and regio-error by subtracting the contribution from PPQ and PPE. For propylene-ethylene copolymers the rr region is corrected for ethylene and regio-error by subtracting the contribution from PQE and EPE. For copolymers with other monomers that produce peaks in the regions of mm, mr, and rr, the integrals for these regions are similarly corrected by subtracting the interfering peaks using standard NMR techniques, once the peaks have been identified. This can be accomplished, for example, by analyzing a series of copolymers of various levels of monomer incorporation, by literature assignments, by isotopic labeling, or other means that are known in the art.

For copolymers made using a nonmetallocene, metal-centered, heteroaryl ligand catalyst, such as described in U.S. Pat. No. 6,960,635, the $^{13}$C NMR peaks corresponding to a regio-error at about 14.6 and about 15.7 ppm are believed to be the result of stereo-selective 2,1-insertion errors of propylene units into the growing polymer chain. In general, for a given comonomer content, higher levels of regio-errors lead to a lowering of the melting point and the modulus of the polymer, while lower levels lead to a higher melting point and a higher modulus of the polymer.

Matrix Method for Calculation of B-Values According to Koenig, J. L.

For propylene/ethylene copolymers the following procedure can be used to determine the comonomer composition and sequence distribution. Integral areas are determined from the $^{13}$CNMR spectrum and input into the matrix calculation to determine the mole fraction of each triad sequence. The matrix assignment is then used with the integrals to yield the mole fraction of each triad. The matrix calculation is a linear least squares implementation of Randall's (Journal of Macromolecular Chemistry and Physics, Reviews in Macromolecular Chemistry and Physics, C29 (2&3), 201-317, 1989) method modified to include the additional peaks and sequences for the 2,1 regio-error. Table A shows the integral regions and triad designations used in the assignment matrix. The numbers associated with each carbon indicate in which region of the spectrum it will resonate.

Mathematically the Matrix Method is a vector equation s=fM where M is an assignment matrix, s is a spectrum row vector, and f is a mole fraction composition vector. Successful implementation of the Matrix Method requires that M, f, and s be defined such that the resulting equation is determined or over determined (equal or more independent equations than variables) and the solution to the equation contains the molecular information necessary to calculate the desired structural information. The first step in the Matrix Method is to determine the elements in the composition vector f. The elements of this vector should be molecular parameters selected to provide structural information about the system being studied. For copolymers, a reasonable set of parameters would be any odd n-ad distribution. Normally peaks from individual triads are reasonably well resolved and easy to assign, thus the triad distribution is the most often used in this composition vector f. The triads for the E/P copolymer are EEE, EEP, PEE, PEP, PPP, PPE, EPP, and EPE. For a polymer chain of reasonable high molecular weight (>=10,000 g/mol), the $^{13}$C NMR experiment cannot distinguish EEP from PEE or PPE from EPP. Since all Markovian E/P copolymers have the mole fraction of PEE and EPP equal to each other, the equality restriction was chosen for the implementation as well. Same treatment was carried out for PPE and EPP. The above two equality restrictions reduce the eight triads into six independent variables. For clarity reason, the composition vector f is still represented by all eight triads. The equality restrictions are implemented as internal restrictions when solving the matrix. The second step in the Matrix Method is to define the spectrum vector s. Usually the elements of this vector will be the well-defined integral regions in the spectrum. To insure a determined system the number of integrals needs to be as large as the number of independent variables. The third step is to determine the assignment matrix M. The matrix is constructed by finding the contribution of the carbons of the center monomer unit in each triad (column) towards each integral region (row). One needs to be consistent about the polymer propagation direction when deciding which carbons belong to the central unit. A useful property of this assignment matrix is that the sum of each row should equal to the number of carbons in the center unit of the triad that is the contributor of the row. This equality can be checked easily and thus prevents some common data entry errors.

After constructing the assignment matrix, a redundancy check needs to be performed. In other words, the number of linearly independent columns needs to be greater or equal to the number of independent variables in the product vector. If the matrix fails the redundancy test, then one needs to go back to the second step and repartition the integral regions and then redefine the assignment matrix until the redundancy check is passed.

In general, when the number of columns plus the number of additional restrictions or constraints is greater than the number of rows in the matrix M the system is over-determined. The greater this difference is the more the system is over-determined. The more over-determined the system, the more the Matrix Method can correct for or identify inconsistent data which might arise from integration of low signal to noise (S/N) ratio data, or partial saturation of some resonances.

The final step is to solve the matrix. This is easily executed in Microsoft Excel by using the Solver function. The Solver works by first guessing a solution vector (molar ratios among different triads) and then iteratively guessing to minimize the sum of the differences between the calculated product vector and the input product vector s. The Solver also lets one input restrictions or constraints explicitly.

The contribution of each carbon on the central unit of each triad towards different integral regions, with P=propylene, E=ethylene, and Q=2,1 inserted propylene, is reported in the following table.

| Triad Name | Structure | Region for 1 | Region for 2 | Region for 3 |
|---|---|---|---|---|
| PPP | | L | A | O |
| PPE | | J | C | O |
| EPP | | J | A | O |
| EPE | | H | C | O |
| EEEE | | K | K | |
| EEEP | | K | J | |
| EEP | | M | C | |
| PEE | | M | J | |
| PEP | | N | C | |

-continued

| Triad Name | Structure | Region for 1 | Region for 2 | Region for 3 |
|---|---|---|---|---|
| PQE | (structure) | F | G | O |
| QEP | (structure) | F | F | |
| XPPQE | (structure) | J | F | O |
| XPPQP | (structure) | J | E | O |
| PPQPX | (structure) | I | D | Q |
| PQPPX | (structure) | F | B | P |

Chemical Shift Ranges

| A | B | C | D | E | F | G | H | I |
|---|---|---|---|---|---|---|---|---|
| 48.00 | 43.80 | 39.00 | 37.25 | 35.80 | 35.00 | 34.00 | 33.60 | 32.90 |
| 45.60 | 43.40 | 37.30 | 36.95 | 35.40 | 34.50 | 33.60 | 33.00 | 32.50 |

| J | K | L | M | N | O | P | Q |
|---|---|---|---|---|---|---|---|
| 31.30 | 30.20 | 29.30 | 27.60 | 25.00 | 22.00 | 16.00 | 15.00 |
| 30.30 | 29.80 | 28.20 | 27.10 | 24.50 | 19.50 | 15.00 | 14.00 |

1,2 inserted propylene composition is calculated by summing all of the stereo-regular propylene centered triad sequence mole fractions. 2,1 inserted propylene composition (Q) is calculated by summing all of the Q centered triad sequence mole fractions. The mole percent is calculated by multiplying the mole fraction by 100. C2 composition is determined by subtracting the P and Q mole percentage values from 100.

The skewness index is calculated from data obtained from temperature-rising elution fractionation (TREF). The data is expressed as a normalized plot of weight fraction as a function of elution temperature. The separation mechanism is analogous to that of copolymers of ethylene, whereby the molar content of the crystallizable component (ethylene) is the primary factor that determines the elution temperature. In the case of copolymers of propylene, it is the molar content of isotactic propylene units that primarily determines the elution temperature.

The shape of the metallocene curve arises from the inherent, random incorporation of comonomer. A prominent characteristic of the shape of the curve is the tailing at lower elution temperature compared to the sharpness or steepness of the curve at the higher elution temperatures. A statistic that reflects this type of asymmetry is skewness. Equation 1 mathematically represents the skewness index, $S_{ix}$, as a measure of this asymmetry.

$$S_{ix} = \frac{\sqrt[3]{\sum w_i * (T_i - T_{\text{Max}})^3}}{\sqrt{\sum w_i * (T_i - T_{\text{Max}})^2}} \quad \text{Equation 1}$$

The value, $T_{max}$, is defined as the temperature of the largest weight fraction eluting between 50 and 90 C in the TREF curve. $T_i$ and $w_i$ are the elution temperature and weight fraction respectively of an arbitrary, $i^{th}$ fraction in the TREF distribution. The distributions have been normalized (the sum of the $w_i$ equals 100%) with respect to the total area of the curve eluting above 30 C. Thus, the index reflects only the shape of the crystallized polymer. Any uncrystallized polymer (polymer still in solution at or below 30 C) has been omitted from the calculation shown in Equation 1.

Certain of the copolymers of this invention are characterized by a DSC curve with a $T_{me}$ that remains essentially the same and a $T_{max}$ that decreases as the amount of unsaturated comonomer in the copolymer is increased. $T_{me}$ means the temperature at which the melting ends. $T_{max}$ means the peak melting temperature.

In one embodiment, the low crystallinity polymer further includes a non-conjugated diene monomer to aid in the vulcanization and other chemical modification of the polymer blend composition. In a particular aspect of this embodiment, the amount of diene can be less than about 10 weight percent (wt %), or less than about 5 wt %. The diene may be any non-conjugated diene that is commonly used for the vulcanization of ethylene/propylene rubbers including, but not limited to, ethylidene norbornene, vinyl norbornene, or dicyclopentadiene.

The low crystallinity polymer can be produced by any process that provides the desired polymer properties, in heterogeneous polymerization on a support, such as slurry or gas phase polymerization, or in homogeneous conditions in bulk polymerization in a medium comprising largely monomer or in solution with a solvent as diluent for the monomers. For industrial uses, continuous polymerization processes are preferred. For homogeneous polymers, the polymerization process is preferably a single stage, steady state polymerization conducted in a well-mixed continuous feed polymerization reactor. The polymerization can be conducted in solution, although other polymerization procedures such as gas phase or slurry polymerization, which fulfill the requirements of single stage polymerization and continuous feed reactors, are contemplated.

The continuous solution polymerization described in WO 02/34795 can make the low crystallinity polymers, optionally in a single reactor and recovered by liquid phase separation from the alkane solvent.

The low crystallinity polymers of the present invention also can be produced in the presence of a chiral metallocene catalyst with an activator and optional scavenger. The use of single site catalysts can be used to enhance the homogeneity of the low crystallinity polymer. As only a limited tacticity is needed, many different forms of single site catalyst may be used. Possible single site catalysts are metallocenes, such as those described in U.S. Pat. No. 5,026,798, which have a single cyclopentadienyl ring, optionally substituted and/or forming part of a polycyclic structure, and a hetero-atom, generally a nitrogen atom, but possibly also a phosphorus atom or phenoxy group connected to a group 4 transition metal, such as titanium, zirconium, or hafnium. A further example is $MeSCpTiMe_3$ activated with $B(CF)_3$ as used to produce elastomeric polypropylene with an Mn of up to 4 million. See Sassmannshausen, Bochmann, Rosch, Lilge, J. Organomet. Chem. (1997), vol 548, pp. 23-28.

Other possible single site catalysts are metallocenes which are biscyclopentadienyl derivatives having a group transition metal, such as hafnium or zirconium. Such metallocenes may be non-bridged as in U.S. Pat. No. 4,522,982 or 5,747,621. The metallocene may be adapted for producing the low crystallinity polymer comprising predominantly propylene derived units as in U.S. Pat. No. 5,969,070 which uses a non-bridged bis(2-phenyl indenyl) zirconium dichloride to produce a homogeneous polymer having a melting point of above 79 C. The cyclopentadienyl rings may be substituted and/or part of polycyclic systems as described in the above patents.

Other possible metallocenes include those in which the two cyclopentadienyls are connected through a bridge, generally a single atom bridge such as a silicon or carbon atom with a choice of groups to occupy the two remaining valences. Such metallocenes are described in U.S. Pat. No. 6,048,950 which discloses bis(indenyl)bis(dimethylsilyl) zirconium dichloride and methyl aluminoxane (MAO); WO 98/27154 which discloses a dimethylsilyl bridged bisindenyl hafnium dimethyl together with a non-coordinating anion activator; EP1070087 which discloses a bridged biscyclopentadienyl catalyst which has elements of asymmetry between the two cyclopentadienyl ligands to give a polymer with elastic properties; and the metallocenes described in U.S. Pat. Nos. 6,448, 358 and 6,265,212.

In the embodiment that uses a single-site catalyst, the manner of activation of the single site catalyst can vary to convenience. Alumoxane, such as methyl alumoxane, may be used. Higher molecular weights may be obtained using non- or weakly coordinating anion activators (NCA) derived and generated in any of the ways amply described in published patent art such as EP 277 004, EP 426 637, and many others. Activation generally is believed to involve abstraction of an anionic group such as the methyl group to form a metallocene cation, although according to some literature zwitterions may be produced. The NCA precursor may be an ion pair of a borate or aluminate in which the precursor cation is eliminated upon activation in some manner, e.g. trityl or ammonium derivatives of tetrakis pentafluorophenyl boron (see EP 277 004). The NCA precursor may be a neutral compound such as a borane, which is formed into a cation by the abstraction of and incorporation of the anionic group abstracted from the metallocene (see EP 426 638).

In a particular embodiment, the low crystallinity polymer is described in detail as the "Second Polymer Component (SPC)" in WO 00/69963, WO 00/01766, WO 99/07788, WO 02/083753, and described in further detail as the "Propylene Olefin Copolymer" in WO 00/01745.

Fourier Transform Infrared Spectroscopy (FTIR) can measure comonomer content of discrete molecular weight ranges in conjunction with samples collected by GPC. One such method is described in Wheeler and Willis, Applied Spectroscopy, (1993), vol. 47, pp. 1128-1130. Different but similar methods are equally functional for this purpose and well known to those skilled in the art. Comonomer content and sequence distribution of the polymers can be measured by $^{13}CNMR$.

In some embodiments, the low crystallinity polymer is present in the article in an amount from a lower limit of about 5%, or 10%, or 20%, or 30% or 60% or 70% or 75% to an upper limit of about 98%, or 90%, or 85%, or 80%, by weight based on the total weight of the article. The balance of the article includes the high crystallinity polymer, optional additional polymer, and various additives as described above.

Additional Polymers

In some embodiments, the low crystallinity layer optionally comprises one or more additional polymers. The optional additional polymer can be the same or different from the high crystallinity polymer of the high crystallinity layer. In a particular embodiment, the additional polymer has a crystallinity between the crystallinity of the low crystallinity polymer and the high crystallinity polymer.

In a particular embodiment, the low crystallinity layer is a blend comprising a continuous phase including the low crystallinity polymer described above and a dispersed phase including a relatively more crystalline additional polymer. Minor amounts of the additional polymer may be present in the continuous phase. In a particular aspect of this embodiment, the dispersed phase is composed of individual domains less than 50 microns in diameter. In some embodiments, these individual domains of the dispersed phase can be maintained during processing even without cross-linking.

In one embodiment, the additional polymer is a propylene copolymer of ethylene, a $C_4$-$C_{20}$ α-olefin, or combinations thereof, wherein the amount of ethylene and/or $C_4$-$C_{20}$ α-olefin(s) present in the additional polymer is less than the amount of ethylene and/or $C_4$-$C_{20}$ α-olefin(s) present in the low crystallinity polymer. In a particular embodiment, the low crystallinity polymer and additional polymer have polypropylene sequences of the same stereo-regularity. In a non-limiting example, the low crystallinity polymer and additional polymer include isotactic polypropylene segments, wherein greater than 50% of adjacent polypropylene segments are isotactic.

In one embodiment, the low crystallinity layer is a blend comprising from about 2% to about 95% by weight of an additional polymer and from about 5% to about 98% by weight of the low crystallinity polymer based on the total weight of the blend, in which the additional polymer is more crystalline than the low crystallinity polymer. In a particular aspect of this embodiment, the additional polymer is present in the blend in an amount of from a lower limit of about 2% or 5% to an upper limit of about 30% or 20% or 15% by weight based on the total weight of the blend. In another particular aspect of this embodiment, the additional polymer is isotactic polypropylene and has a melting point greater than about 110 C, and the low crystallinity polymer is a random copolymer produced by copolymerizing propylene and at least one of ethylene or an α-olefin having less than 6 carbon atoms using a chiral metallocene catalyst system. Also, in this embodiment, the low crystallinity polymer has a crystallinity from about 2% to about 50% from isotactic polypropylene sequences, a propylene content of from about 75% to about 90% by weight, and a melting point of from about 25 C to about 105 C.

The blend of the low crystallinity layer is distinguishable from commonly available reactor products, which frequently consist of a blend of isotactic polypropylene and copolymers of propylene and ethylene, which have only a single phase with no prominent dispersed or continuous phases. The present blend is also distinguishable from impact copolymers, thermoplastic olefins and thermoplastic elastomers produced by chiral metallocene catalysts which when combined with a second polymer have heterophasic morphology.

Typically, in those materials the more crystalline polymer is part of the continuous phase and not the dispersed phase. The present blend is also distinguishable from other multi-phase blend compositions in that a pre-formed or in situ formed compatibilizer does not need to be added to attain and retain the morphology between the low crystallinity continuous phase and the high crystallinity dispersed phase.

High Crystallinity Layer

The high crystallinity layer has a level of crystallinity sufficient to permit yield and plastic deformation during elongation. The high crystallinity layer can be oriented in the machine, cross (transverse) or oblique direction only, or in two or more of these directions as can be detected by microscopy. The orientation can lead to subsequent frangibility of the high crystallinity layer.

High Crystallinity Polymer

The high crystallinity layer includes a high crystallinity polymer. The high crystallinity polymers of the present invention are defined as polymeric components, including blends, that include homopolymers or copolymers of ethylene or propylene or an α-olefin having 12 carbon atoms or less with minor olefinic monomers that include linear, branched, or ring-containing $C_3$ to $C_{30}$ olefins, capable of insertion polymerization, or combinations of such olefins. In one embodiment, the amount of α-olefin in the copolymer has an upper range of about 9 wt %, or 8 wt %, or 6 wt %, and a lower range of about 2 wt %, based on the total weight of the high crystallinity polymer.

Examples of minor olefinic monomers include, but are not limited to $C_2$ to $C_{20}$ linear or branched α-olefins, such as ethylene, propylene, 1-butene, 1-hexene, 1-octene, 4-methyl-1-pentene, 3-methyl-1-pentene, and 3,5,5-trimethyl-1-hexene, and ring-containing olefinic monomers containing up to 30 carbon atoms such as cyclopentene, vinylcyclohexane, vinylcyclohexene, norbornene, and methyl norbornene.

Suitable aromatic-group-containing monomers can contain up to 30 carbon atoms and can comprise at least one aromatic structure, such as a phenyl, indenyl, fluorenyl, or naphthyl moiety. The aromatic-group-containing monomer further includes at least one polymerizable double bond such that after polymerization, the aromatic structure will be pendant from the polymer backbone. The polymerizable olefinic moiety of the aromatic-group containing monomer can be linear, branched, cyclic-containing, or a mixture of these structures. When the polymerizable olefinic moiety contains a cyclic structure, the cyclic structure and the aromatic structure can share 0, 1, or 2 carbons. The polymerizable olefinic moiety and/or the aromatic group can also have from one to all of the hydrogen atoms substituted with linear or branched alkyl groups containing from 1 to 4 carbon atoms. Examples of aromatic monomers include, but are not limited to styrene, alpha-methylstyrene, vinyltoluenes, vinylnaphthalene, allyl benzene, and indene, especially styrene and allyl benzene.

In one embodiment, the high crystallinity polymer is a homopolymer or copolymer of polypropylene with isotactic propylene sequences or mixtures of such sequences. The polypropylene used can vary widely in form. The propylene component may be a combination of homopolymer polypropylene, and/or random, and/or block copolymers. In a particular embodiment, the high crystallinity polymer is copolymer of propylene and one or more comonomers selected from ethylene and $C_4$ to $C_{12}$ α-olefins. In a particular aspect of this embodiment, the comonomer is present in the copolymer in an amount of up to about 9% by weight, or from about 2% to about 8% by weight, or from about 2% to about 6% by weight, based on the total weight of the copolymer.

In another embodiment, the high crystallinity polymer is a homopolymer or copolymer of ethylene and one or more comonomers selected from $C_3$ to $C_{20}$ α-olefins. In a particular aspect of this embodiment, the comonomer is present in the copolymer in an amount of from about 2 wt % to about 25 wt % based on the total weight of the copolymer.

In certain embodiments of the invention, the high crystallinity polymer has a weight average molecular weight (Mw) of from about 10,000-5,000,000 g/mol, or from about 20,000-1,000,000 g/mol, or from about 80,000-500,000 g/mol and a molecular weight distribution Mw/Mn (sometimes referred to as a "polydispersity index" (PDI)) ranging from a lower limit of about 15-1.8 to an upper limit of about 40 or 20 or 10 or 5 or 3.

In one embodiment, the high crystallinity polymer is produced with metallocene catalysis and displays narrow molecular weight distribution, meaning that the ratio of the weight average molecular weight to the number average molecular weight will be equal to or below about 4, most typically in the range of from about 1.7-4.0, preferably from about 1.8-2.8.

In another embodiment, the high crystallinity polymer is produced with a single-site catalyst (in the context of this embodiment, the term "single-site" includes non-metallocene single-site catalysts) and displays narrow molecular weight distribution, meaning that the ratio of the weight average molecular weight to the number average molecular weight will be equal to or below about 4, most typically in the range of from about 1.7-4.0, preferably from about 1.8-2.8.

In another embodiment, the high crystallinity polymer is produced with a Ziegler-Natta or chrome catalyst, and it displays medium to broad molecular weight distribution, meaning that the ratio of the weight average molecular weight to the number average molecular weight will be equal to or below about 60, more typically in the range of about 3.5 to 50, preferably in the range of about 3.5 to 20.

The high crystallinity polymers of the present invention can optionally contain long chain branches. These can optionally be generated using one or more α,ω-dienes. Alternatively, the high crystallinity polymer may contain small quantities of at least one diene, and preferably at least one of the dienes is a non-conjugated diene to aid in the vulcanization or other chemical modification. The amount of diene is preferably no greater than about 10 wt %, more preferably no greater than about 5 wt %. Preferred dienes are those that are used for the vulcanization of ethylene/propylene rubbers including, but not limited to, ethylidene norbornene, vinyl norbornene, dicyclopentadiene, and 1,4-hexadiene.

Embodiments of the invention include high crystallinity polymers having a heat of fusion, as determined by DSC, with a lower limit of about 60 J/g, or 80 J/g. In one embodiment, the high crystallinity polymer has a heat of fusion higher than the heat of fusion of the low crystallinity polymer.

Embodiments of the invention include high crystallinity polymers having a melting point with a lower limit of about 100 C, or 110 C, or 115 C, or 120 C, or 130 C.

In one embodiment, the high crystallinity polymer has a higher crystallinity than the low crystallinity polymer. The degree of crystallinity can be determined based on the heat of fusion of the polymer components. In one embodiment, the low crystallinity polymer has a lower melting point than the high crystallinity polymer, and the additional polymer, if used, has a melting point between that of the low crystallinity polymer and that of the high crystallinity polymer. In another embodiment, the low crystallinity polymer has a lower heat of fusion than that of the high crystallinity polymer, and the additional polymer, if used, has a heat of fusion intermediate of the low crystallinity polymer and the high crystallinity polymer.

Compatible Crystallinity

In some embodiments the low crystallinity polymer and high crystallinity polymer have compatible crystallinity. Compatible crystallinity can be obtained by using polymers for the high crystallinity and low crystallinity layers that have the same crystallinity type, i.e., based on the same crystallizable sequence, such as ethylene sequences or propylene sequences, or the same stereo-regular sequences, i.e., isotactic or syndiotactic. For example, compatible crystallinity can be achieved by providing both layers with methylene sequences of sufficient length, as is achieved by the incorporation of ethylene derived units.

Compatible crystallinity can also be obtained by using polymers with stereo-regular α-olefin sequences. This may be achieved, for example, by providing either syndiotactic sequences or isotactic sequences in both layers.

In one embodiment both the high crystallinity polymer and the low crystallinity polymer, including anything blended in it, contain polypropylene sequences that are substantially isotactic. In another embodiment, both the high crystallinity polymer and the low crystallinity polymer, including anything blended in it, contain polypropylene sequences that are substantially syndiotactic.

For purposes of this invention, isotactic refers to a polymer sequence in which greater than 50% of adjacent monomers which have groups of atoms that are not part of the backbone structure are located either all above or all below the atoms in the backbone chain, when the latter are all in one plane.

For purposes of this invention, syndiotactic refers to a polymer sequence in which greater than 50% of adjacent monomers which have groups of atoms that are not part of the backbone structure are located in a symmetrical fashion above and below the atoms in the backbone chain, when the latter are all in one plane.

Applications of the Article

The articles of the present invention may be used in a variety of applications. In one embodiment, the article is a film having at least two layers, which can be used in diaper back-sheets and similar absorbent garments such as incontinent garments. In other embodiments, the article is in the form of a fabric or fiber. The fabric may be woven or non-woven. The fiber can be of any size or shape, and it can be homogeneous or heterogeneous. If heterogeneous, then it can be either bicomponent or biconstituent.

The core layer or layers of the film of this invention comprise a low crystalline propylene copolymer. If the film of this invention comprises two or more core layers, then the composition of each core layer can be the same or different from the composition of the other core layer(s).

The skin layers of the film of this invention comprise a high crystalline, preferably non-tacky polyolefin homo- or copolymer. "Non-tacky" and similar terms mean non-tacky to the touch. The composition of each skin layer can be the same or different from the composition of the other skin layer(s).

The particular combination of core and skin layers is chosen to insure that the melting point of the core polymer is not more than about 24 C greater than the melting point of the skin polymer with the lowest melting point.

Specific Embodiments

Measurement Methods

Density Method:

Coupon samples (1 inch×1 inch×0.125 inch) were compression molded at 190° C. according to ASTM D4703-00 and cooled using procedure B. Once the sample cooled to 40-50° C., it was removed. Once the sample reached 23° C., its dry weight and weight in isopropanol was measured using an Ohaus AP210 balance (Ohaus Corporation, Pine Brook N.J.). Density was calculated as prescribed by ASTM D792 procedure B.

DSC Method:

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., *Thermal Characterization of Polymeric Materials*, Academic Press, 1981). Certain of the copolymers used in the practice of this invention are characterized by a DSC curve with a $T_{me}$ that remains essentially the same and a $T_{max}$ that decreases as the amount of unsaturated comonomer in the copolymer is increased. $T_{me}$ means the temperature at which the melting ends. $T_{max}$ means the peak melting temperature.

Differential Scanning Calorimetry (DSC) analysis is determined using a model Q1000 DSC from TA Instruments, Inc. Calibration of the DSC is done as follows. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

The samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and the heated at a high rate of about 100° C./min to a temperature of about 60° C. above the melt temperature. The sample is kept at this temperature for about 3 minutes. Then the sample is cooled at a rate of 10° C./min to −40° C., and kept isothermally at that temperature for 3 minutes. Consequently the sample is heated at a rate of 10° C./min until complete melting. The resulting enthalpy curves are analyzed for peak melt temperature, onset and peak crystallization temperatures, heat of fusion and heat of crystallization, $T_{me}$, and any other DSC analyses of interest. The temperature at the highest heat flow rate within the melting range without reference to a baseline is taken as the peak melting point.

Mechanical testing was performed using an Instron (Model 5564) sourced from Instron Corporation (Norwood, Mass.).

The copolymers used in the following inventive and comparative examples are described in Table I. These copolymers follow the description of the preferred embodiments described earlier. These copolymers were produced in accordance with U.S. Pat. No. 6,960,635.

procedure for blending of the polymers to balance the need for intimate mixing of the component ingredients with the desire for process economy.

Blend components are selected based on the morphology desired for a given application. The high crystallinity polymer can be co-continuous with the low crystallinity polymer in the film formed from the blend, however, a dispersed high crystallinity polymer phase in a continuous low crystallinity polymer phase is preferred. Those skilled in the art can select the volume fractions of the two components to produce a dispersed high crystallinity polymer morphology in a continuous low crystallinity polymer matrix based on the viscosity

TABLE I

Resins

| Designation | Description | Density (g/cc) | Ethylene (wt. %) | $T_m$ (° C.) | MFR (230° C., 2.16 kg) |
|---|---|---|---|---|---|
| P/E-1 | propylene-ethylene | 0.859 | 15 | 131-143 | 2 |
| P/E-2 | propylene-ethylene | 0.867 | 12 | 121-138 | 2 |
| P/E-3 | propylene-ethylene | 0.888 | 5 | 115 | 2 |

| Designation | Description | Density (g/cc) | Melt Index (190° C., 2.16 kg) | Tm (° C.) |
|---|---|---|---|---|
| E/O-1 | homogeneous ethylene-octene | 0.857 | 1 | 45 |
| E/O-2 | homogeneous ethylene-octene | 0.870 | 1 | 58 |
| E/O-3 | Ziegler-Natta ethylene-octene LLDPE | 0.917 | 2.3 | 122 |

| Designation | Polystyrene Content | Styrene/Rubber Ratio | Diblock (%) |
|---|---|---|---|
| SEBS | 12.3-14.3 | 13/87 | 30 |

Melt Flow Rate (MFR) and Melt Index (MI), as used herein, were measured by ASTM D-1238 at 230 C and 190 C, respectively.

Blends of low crystallinity polymer and high crystallinity polymer and other components may be prepared by any procedure that guarantees an intimate mixture of the components. For example, the components can be combined by melt pressing the components together on a Carver press to a thickness of about 0.5 millimeter (20 mils) and a temperature of about 180 C, rolling up the resulting slab, folding the ends together, and repeating the pressing, rolling, and folding operation about 10 times. Internal mixers are particularly useful for solution or melt blending. Blending at a temperature of about 180-240 C in a Brabender Plastograph for about 1-20 minutes has been found satisfactory.

Still another method that may be used for admixing the components involves blending the polymers in a Banbury internal mixer above the flux temperature of all of the components, e.g., about 180 C for about 5 minutes. A complete mixture of the polymeric components is indicated by the uniformity of the morphology of the dispersion of low crystallinity polymer and high crystallinity polymer. Continuous mixing may also be used. These processes are well known in the art and include single and twin screw mixing extruders, static mixers for mixing molten polymer streams of low viscosity, impingement mixers, as well as other machines and processes, designed to disperse the low crystallinity polymer and the high crystallinity polymer in intimate contact. Those skilled in the art will be able to determine the appropriate ratio of the components (see S. Wu, Polymer Engineering and Science, Vol. 27, Page 335, 1987).

The 3-layer blown film line used to prepare the inventive and comparative examples is described as follows. There are three extruders [a 60 horsepower extruder fitted with a 2.5 inch diameter high shear screw (Davis-Standard Film & Coating Systems, Somerville N.J.), a 75 horsepower extruder fitted with a 2.5 inch diameter screw (Davis-Standard Film & Coating Systems), and a 20 horsepower Johnson extruder fitted with a 2 inch diameter single flight screw] which feed a 6 inch diameter multilayer die (Macro Engineering and Technology Inc, Mississauga, Ontario). For the inventive and comparative examples, a 70 mil (1.778 mm) die gap was used. Frost line height was about 24-30 inches.

The inventive and comparative examples were extruded according to the conditions described in Table II. Co1 and Co2 are the comparative films. Ex1 and Ex2 are inventive films.

TABLE II

| Film Blowing Conditions | | | | |
|---|---|---|---|---|
| Film | Co1 | Co2 | Ex1 | Ex2 |
| Layer A | E/O-3 | E/O-3 | P/E-3 | P/E-3 |
| Layer B | E/O-1 | E/O-2 | P/E-1 | P/E-2 |
| Layer C | E/O-3 | E/O-3 | P/E-3 | P/E-3 |
| A/B/C | 5/90/5 | 5/90/5 | 5/90/5 | 5/90/5 |
| A Actual Rate (lb/hr) | 9.4 | 9.2 | 9.3 | 9.3 |
| Melt Temp (° F.) | 359 | 353 | 372 | 369 |

TABLE II-continued

Film Blowing Conditions

| | Film | Co1 | Co2 | Ex1 | Ex2 |
|---|---|---|---|---|---|
| B | Actual Rate (lb/hr) | 159.2 | 156.9 | 156.7 | 156.1 |
| | Melt Temp (° F.) | 458 | 462 | 470 | 479 |
| C | Actual Rate (lb/hr) | 9.4 | 9.4 | 9.3 | 9 |
| | Melt Temp (° F.) | 369 | 365 | 380 | 377 |
| A | Barrel 1 (° F.) | 375 | 375 | 404 | 400 |
| | Barrel 2 (° F.) | 425 | 425 | 426 | 425 |
| | Barrel 3 (° F.) | 385 | 385 | 403 | 400 |
| | Barrel 4 (° F.) | 385 | 385 | 399 | 400 |
| | Adapter (° F.) | 399 | 402 | 406 | 400 |
| B | Barrel 1 (° F.) | 330 | 330 | 332 | 332 |
| | Barrel 2 (° F.) | 348 | 350 | 351 | 352 |
| | Barrel 3 (° F.) | 370 | 369 | 370 | 370 |
| | Barrel 4 (° F.) | 370 | 368 | 372 | 370 |
| | Adapter (° F.) | 401 | 401 | 400 | 398 |
| C | Barrel 1 (° F.) | 371 | 373 | 412 | 398 |
| | Barrel 2 (° F.) | 434 | 424 | 428 | 428 |
| | Barrel 3 (° F.) | 389 | 390 | 403 | 400 |
| | Barrel 4 (° F.) | 391 | 390 | 408 | 394 |
| | Adapter (° F.) | 401 | 400 | 399 | 400 |
| | Block (° F.) | 436 | 446 | 449 | 450 |
| | Lower Die (° F.) | 450 | 450 | 450 | 450 |
| | Upper Die (° F.) | 451 | 450 | 450 | 451 |
| | Inner Die (° F.) | 450 | 450 | 450 | 450 |
| | Blow-up Ratio | 2.5 | 2.5 | 2.5 | 2.5 |
| | Film Thickness (mil) | 2 | 2 | 2 | 2 |

Test specimens of the required geometry were removed from the films after at least seven days from film manufacture and evaluated on an Instron 5564 equipped with Merlin software available from Instron Corporation (in Canton, Mass.), to produce the mechanical deformation data. The Instron 5564 and associated equipment are available from The Instron Corporation. All data are reported in engineering stress and strain terms with values of the stress uncorrected for the contraction in the cross-section of the sample being tested.

Pre-Stretching:

Micro-tensile samples (ASTM D-1708) were taken using a die-oriented in the machine direction of the film. The gauge length was taken as 22.25 mm. The samples were underwent a pre-stretch step by loading the specimens in the Instron and pulling them to 0 (control) or 100 or 300 or 500% strain at a rate of 500%/min (111.25 mm/min) and then immediately returned to 0% strain at the same rate. The new gauge length was measured after waiting at least 10 minutes after the pre-stretch step.

50, 100, 150% Hysteresis Tests:

The pre-stretched samples were then stretched again ($1^{st}$ stretch step) to 0 or 50 or 100 or 150% strain relative to the new gauge length of the pre-stretched sample at 500%/min and then immediately returned to 0% strain at the same rate. The sample was then immediately extended once again at 500%/min until the onset of positive tensile force. The strain corresponding to the onset of the positive force was taken as the set strain. At least three specimens were measured for each pre-stretch condition and the corresponding to the first stretch condition. The average set strain and standard the corresponding standard deviation are reported in Table III.

TABLE III

Examples

| Example* | A/B/A | Layer A | Layer B | Layer A | Tm, A-Tm, B (° C.) | Pre-stretch % | 1st Stretch % | Avg Set % | Std Dev % |
|---|---|---|---|---|---|---|---|---|---|
| Ref-1a | 5/90/5 | P/E-3 | P/E-1 | P/E-3 | <25 | 0 | 50 | 8.7 | 0.6 |
| Ex1-1 | 5/90/5 | P/E-3 | P/E-1 | P/E-3 | <25 | 100 | 50 | 7.4 | 0.6 |
| Ex1-2 | 5/90/5 | P/E-3 | P/E-1 | P/E-3 | <25 | 300 | 50 | 9.7 | 0.5 |
| Ex1-3 | 5/90/5 | P/E-3 | P/E-1 | P/E-3 | <25 | 500 | 50 | 13.0 | 3.3 |
| Ref-1b | 5/90/5 | P/E-3 | P/E-1 | P/E-3 | <25 | 0 | 100 | 16.1 | 0.0 |
| Ex1-4 | 5/90/5 | P/E-3 | P/E-1 | P/E-3 | <25 | 300 | 100 | 18.7 | 0.9 |
| Ex1-5 | 5/90/5 | P/E-3 | P/E-1 | P/E-3 | <25 | 500 | 100 | 25.6 | 0.3 |
| Ref-1c | 5/90/5 | P/E-3 | P/E-1 | P/E-3 | <25 | 0 | 150 | 22.2 | 1.0 |
| Ex1-6 | 5/90/5 | P/E-3 | P/E-1 | P/E-3 | <25 | 500 | 150 | 38.7 | 0.2 |
| Ref-2a | 5/90/5 | P/E-3 | P/E-2 | P/E-3 | <25 | 0 | 50 | 8.0 | 0.0 |
| Ex2-1 | 5/90/5 | P/E-3 | P/E-2 | P/E-3 | <25 | 100 | 50 | 3.5 | 0.5 |
| Ex2-2 | 5/90/5 | P/E-3 | P/E-2 | P/E-3 | <25 | 300 | 50 | 9.5 | 0.3 |
| Ex2-3 | 5/90/5 | P/E-3 | P/E-2 | P/E-3 | <25 | 500 | 50 | 9.7 | 1.0 |
| Ref-2b | 5/90/5 | P/E-3 | P/E-2 | P/E-3 | <25 | 0 | 100 | 15.8 | 0.6 |
| Ex2-4 | 5/90/5 | P/E-3 | P/E-2 | P/E-3 | <25 | 300 | 100 | 10.3 | 0.6 |
| Ex2-5 | 5/90/5 | P/E-3 | P/E-2 | P/E-3 | <25 | 500 | 100 | 11.8 | 0.3 |
| Ref-2c | 5/90/5 | P/E-3 | P/E-2 | P/E-3 | <25 | 0 | 150 | 27.7 | 0.7 |
| Ex2-6 | 5/90/5 | P/E-3 | P/E-2 | P/E-3 | <25 | 500 | 150 | 19.8 | 0.9 |
| Ref-3a | 5/90/5 | E/O-3 | E/O-1 | E/O-3 | >25 | 0 | 50 | 8.0 | — |
| Co1-1 | 5/90/5 | E/O-3 | E/O-1 | E/O-3 | >25 | 100 | 50 | 8.5 | 0.6 |
| Co1-2 | 5/90/5 | E/O-3 | E/O-1 | E/O-3 | >25 | 300 | 50 | 9.1 | 0.5 |
| Co1-3 | 5/90/5 | E/O-3 | E/O-1 | E/O-3 | >25 | 500 | 50 | 10.0 | 0.3 |
| Ref-3b | 5/90/5 | E/O-3 | E/O-1 | E/O-3 | >25 | 0 | 100 | 17.1 | — |
| Co1-4 | 5/90/5 | E/O-3 | E/O-1 | E/O-3 | >25 | 300 | 100 | 11.9 | 0.8 |
| Co1-5 | 5/90/5 | E/O-3 | E/O-1 | E/O-3 | >25 | 500 | 100 | 12.7 | 0.5 |
| Ref-3c | 5/90/5 | E/O-3 | E/O-1 | E/O-3 | >25 | 0 | 150 | 26.2 | — |
| Co1-6 | 5/90/5 | E/O-3 | E/O-1 | E/O-3 | >25 | 500 | 150 | 15.0 | 1.1 |
| Ref-4a | 5/90/5 | E/O-3 | E/O-2 | E/O-3 | >25 | 0 | 50 | 6.0 | — |
| Co2-1 | 5/90/5 | E/O-3 | E/O-2 | E/O-3 | >25 | 100 | 50 | 6.3 | 0.3 |
| Co2-2 | 5/90/5 | E/O-3 | E/O-2 | E/O-3 | >25 | 300 | 50 | 6.2 | 0.8 |
| Co2-3 | 5/90/5 | E/O-3 | E/O-2 | E/O-3 | >25 | 500 | 50 | 6.4 | 0.8 |
| Ref-4b | 5/90/5 | E/O-3 | E/O-2 | E/O-3 | >25 | 0 | 100 | 15.1 | — |
| Co2-4 | 5/90/5 | E/O-3 | E/O-2 | E/O-3 | >25 | 300 | 100 | 13.5 | 0.3 |
| Co2-5 | 5/90/5 | E/O-3 | E/O-2 | E/O-3 | >25 | 500 | 100 | 13.3 | 0.8 |

TABLE III-continued

| | | | | | | | 1st | Avg | Std |
| | | Layer | Layer | Layer | Tm, A-Tm, B | Pre-stretch | Stretch | Set | Dev |
| Example* | A/B/A | A | B | A | (° C.) | % | % | % | % |
|---|---|---|---|---|---|---|---|---|---|
| Ref-4c | 5/90/5 | E/O-3 | E/O-2 | E/O-3 | >25 | 0 | 150 | 30.0 | — |
| Co2-6 | 5/90/5 | E/O-3 | E/O-2 | E/O-3 | >25 | 500 | 150 | 27.5 | 0.8 |
| Co1-1 | — | — | — | — | — | 0 | 50 | 3 | — |
| Co1-2 | — | — | — | — | — | 0 | 100 | 6 | — |
| Co1-3 | — | — | — | — | — | 0 | 150 | 14 | — |

Figure 2:
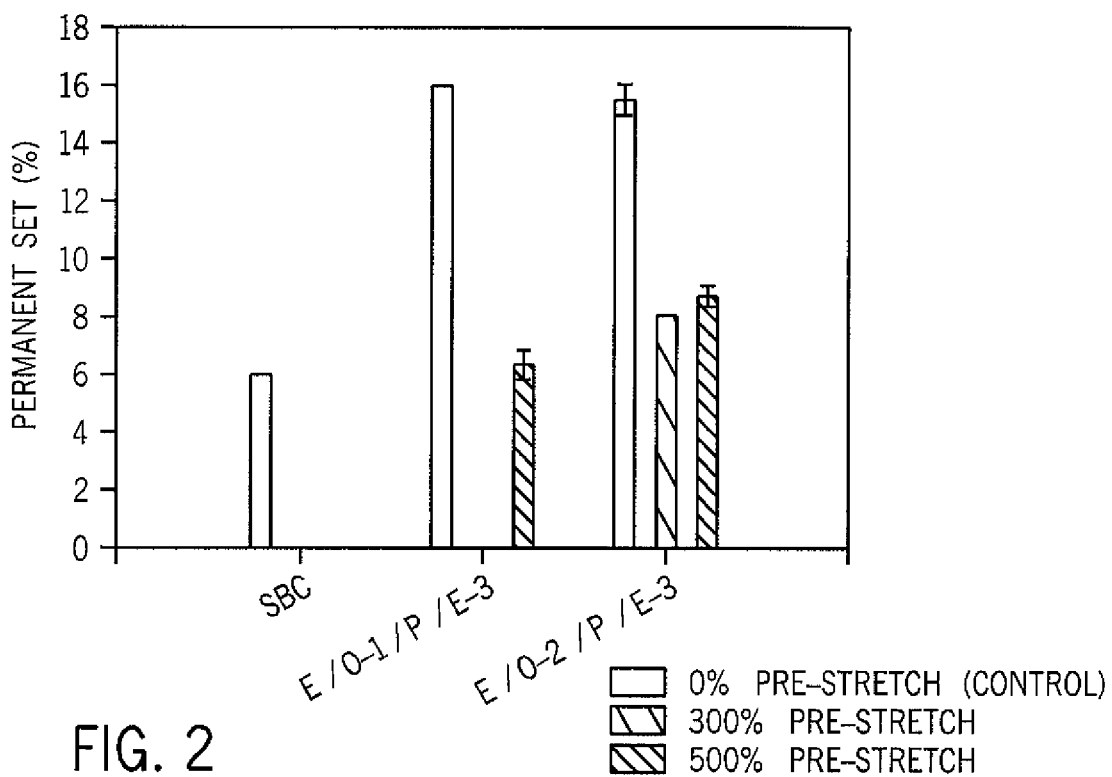
FIG. 2 is a plot of the effect of pre-stretch level on permanent set after a 100% hysteresis test.
Figure 3:
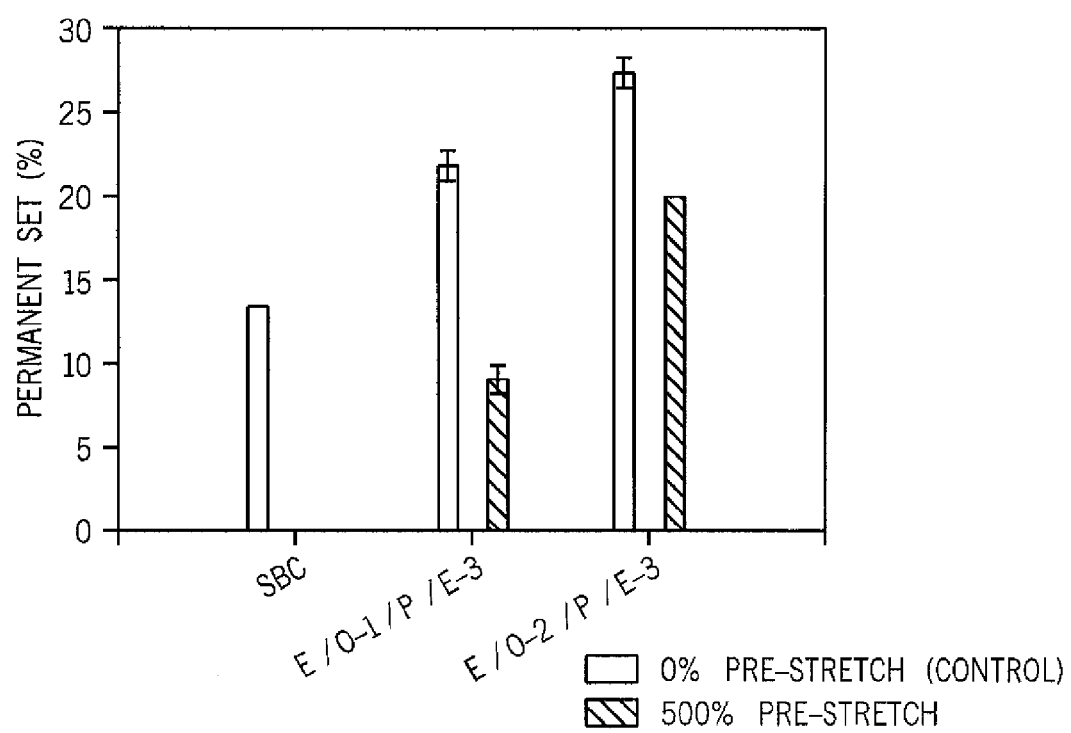
FIG. 3 is a plot of the effect of pre-stretch level on permanent set after a 150% hysteresis test.

*Ex denotes an inventive example. Co denotes a comparative example (compression molded at 190 C.).
Ref denotes unprestretched reference FIG. 1 shows the immediate set behavior for the 50% hysteresis test of the inventive and comparative examples that have undergone pre-stretching from 0% (comparative control) to 100%, to 300%, to 500% strain. The data show that immediate set behavior can be significantly improved by pre-stretching. Significant improvement is also shown for 100% and 150% hysteresis behavior (FIGS. 2 and 3, respectively). The resulting immediate set behavior of the pre-stretched inventive examples is shown to be comparable or better than SBC or polyethylene-based resins. The SBC is an SEBS available from Kraton Polymers (Houston, Tex.).

While the illustrative embodiments of the invention have been described with particularity, various other modifications will be apparent to and can be readily made by those skilled in the art without departing from the spirit and scope of the invention. Accordingly, the scope of the following claims is not limited to the examples and descriptions. Rather the claims are to be construed as encompassing all the features of patentable novelty that reside in the present invention, including all features which would be treated as equivalents of these features by those skilled in the art to which the invention pertains.

When numerical lower limits and numerical upper limits are listed above, ranges from any lower limit to any upper limit are contemplated. All issued U.S. patents and allowed U.S. patent applications cited above are incorporated herein by reference.

What is claimed is:

1. An article having at least two layers, the article comprising (a) a low crystallinity layer comprising a low crystallinity polymer, and (b) a high crystallinity layer comprising a high crystallinity polymer having a melting point as determined by DSC that is less than that of the low crystallinity polymer, wherein the article has been elongated below the melting point of the low crystallinity polymer in at least one direction to an elongation of at least 50% of its original length or width, and further wherein the low crystallinity polymer and high crystallinity polymer have a weight percent crystallinity difference of at least about 1%.

2. The article of claim 1 in which the low and high crystallinity polymer have compatible crystallinity.

3. The article of claim 1 in which the high crystallinity polymer is present in the article at a level less than about 20 weight % based on the combined weight of the high and low crystallinity polymers.

4. The article of claim 1 in which the high crystallinity polymer is present in the article at a level less than about 10 weight % based on the combined weight of the high and low crystallinity polymers.

5. The article of claim 1 in which the low crystallinity polymer is present in the article at a level at least about 45 weight % based on the combined weight of the high and low crystalline polymers.

6. The article of claim 1 in which one of the layers comprises a nonwoven, and in which the nonwoven comprises the high crystallinity polymer.

7. The article of claim 1 in which one of the layers comprises a film, and in which the film layer comprises the high crystallinity polymer.

8. The article of claim 1 in which each layer comprises a film.

9. The article of claim 1 in which one of the layers comprises a film, and in which the film layer comprises the low crystallinity polymer.

10. The article of claim 1 in which the low crystallinity layer further comprises an additional polymer.

11. The article of claim 1 in which the additional polymer has a higher crystallinity than the low crystallinity polymer.

12. The article of claim 1 in which the additional polymer is present in an amount of from about 2 wt % to about 30 wt % based on the weight of the low crystallinity layer.

13. The article of claim 1 in which the low crystallinity polymer is a copolymer of propylene and one or more comonomers selected from ethylene and $C_4$-$C_{20}$ α-olefins, and in which units derived from the one or more comonomers is present in the low crystallinity polymer in an amount of from about 2 wt % to about 25 wt %, based on the weight of the low crystallinity polymer.

14. The article of claim 13 in which the low crystallinity propylene copolymer has a MFR as measured by ASTM D-1238 Condition L of from about 0.2 to about 90 g/10 minutes.

15. The article of claim 14 in which the low crystallinity polymer has a heat of fusion as determined by DSC of from about 3 J/g to about 50 J/g and a molecular weight distribution of from about 2 to about 4.5.

16. The article of claim 15 in which the high crystallinity polymer is a homopolymer or copolymer of propylene and one or more comonomers selected from ethylene and $C_4$-$C_{20}$ α-olefins.

17. The article of claim 15 in which the high crystallinity polymer is a homopolymer or copolymer of ethylene and one or more comonomers selected from ethylene and $C_3$-$C_{20}$ α-olefins.

18. The article of claim 17 in which the low crystallinity layer is in contact with the high crystallinity layer.

19. The article of claim 2 in which the article comprises a film, and the film comprises an additional layer in contact with the high crystallinity layer.

20. The article of claim 2 in which the article comprises a film, and the film comprises an additional layer in contact with the low crystallinity layer.

21. The article of claim 20 in which the additional layer is more crystalline than the low crystallinity layer.

22. The article of claim 2 in which the high crystallinity layer is plastically deformed.

23. The article of claim 2 in which both layers have been elongated at least about 50%.

24. The article of claim 2 in which the high crystalline layer is a nonwoven layer.

25. The article of claim 2 in which the low crystalline layer is a nonwoven layer.

26. The article of claim 22 comprising a film, and the film has a haze value of greater than about 70%.

27. The film of claim 26 having a permanent set of less than about 30% after a 50% hysteresis test.

28. The film of claim 26 comprising three or more layers.

29. A garment portion comprising the article of claim 26 adhered to a garment substrate.

30. The article of claim 2 in which at least one layer further comprises at least one of a filler and an additive.

31. The article of claim 30 in which the additive is at least of calcium carbonate, talc, titanium dioxide, carbon black, diatomaceous earth, an anti-block, a slip additive, and an antioxidant.

32. A process for making the article of claim 2 in the form of a film, the process comprising: (1) forming the film, and (2) elongating the film.

33. The process of claim 32 in which the elongating step comprises elongating the film in at least one direction to an elongation of at least about 150% of its original length or width.

34. The process of claim 33 in which the elongating step comprises elongating the film in at least one direction to achieve a haze value of at least about 10%.

35. The article of claim 2 in the form of a fiber.

36. The fiber of claim 35 in the form of a bicomponent fiber in which the high crystallinity polymer comprises at least a portion of the surface of the fiber.

37. The fiber of claim 36 in the form of a bicomponent fiber in which the low crystallinity polymer comprises at least a portion of the surface of the fiber.

38. The fiber of claim 36 having a configuration selected from the group consisting of sheath/core, side-by-side, crescent moon, trilobal, islands-in-the-sea and flat.

39. The fiber of claim 37 having a configuration selected from the group consisting of sheath/core, side-by-side, crescent moon, trilobal, islands-in-the-sea and flat.

40. The fiber of claim 35 in which the high crystallinity polymer has been plastically deformed.

41. A web comprising the fiber of claim 35.

42. The web of claim 41 in which at least a portion of the fibers are bonded to each other.

43. The process of claim 34 in which the elongating step is performed below the melting point of the high crystallinity polymer.

44. The process of claim 34 in which the elongating step is performed below the melting point of the low crystallinity polymer.

45. The fiber of claim 40 in which the high crystallinity polymer further comprises succinic acid or succinic anhydride functionality.

46. The fiber of claim 40 in which the high crystallinity layer comprises at least one Ziegler-Natta, metallocene or single site catalyzed polyolefin and the low crystallinity layer comprises a propylene-based polymer.

47. The article of claim 2 in the form of a multi-layer article comprising at least one skin layer and at least one core layer in which at least one core layer comprises the low crystallinity polymer.

48. The article of claim 2 in the form of a multi-layer article comprising at least one skin layer and at least one core layer in which at least one skin layer comprises the high crystallinity polymer.

49. The article of claim 2 in the form of a crosslinked film.

50. The article of claim 2 in which at least one layer does not have a distinct melting point.

51. The article of claim 2 in which the high crystallinity polymer has a weight percent crystallinity at least 10% higher than the low crystallinity polymer.

52. The article of claim 2 in which the high crystallinity polymer has a weight percent crystallinity at least 18.5% higher than the low crystallinity polymer.

53. The article of claim 2 in which the article has a permanent set of no greater than about 5% after elongation to a strain of 50% at a rate of 500%/min followed by a return to 0% strain at the same rate, wherein the set strain is the strain at the onset of positive tensile force when the article is extended once again at 500%/min.

54. The article of claim 2 in which the article has a permanent set of no greater than about 10% after elongation to a strain of 100% at a rate of 500%/min followed by a return to 0% strain at the same rate, wherein the set strain is the strain at the onset of positive tensile force when the article is extended once again at 500%/min.

55. An article having at least two layers, the article comprising (a) a low crystallinity layer comprising a low crystallinity polymer comprising a copolymer of propylene and ethylene, and (b) a high crystallinity layer in contact with the low crystallinity layer and comprising a high crystallinity polymer comprising a copolymer of propylene and ethylene and having a melting point as determined by DSC that is less than that of the low crystallinity polymer, wherein the high crystallinity polymer has a weight percent crystallinity at least 18.5% higher than the low crystallinity polymer.

56. The article of claim 55 in which the high crystallinity polymer is plastically deformed.

* * * * *